(12) United States Patent
Mesde et al.

(10) Patent No.: US 12,217,323 B2
(45) Date of Patent: Feb. 4, 2025

(54) VEHICLE DATA JURISDICTION MANAGEMENT

(71) Applicant: Amazon Technologies, Inc., Seattle, WA (US)

(72) Inventors: Roland Mesde, Cupertino, CA (US); Alex Bessonov, San Jose, CA (US); Kyle Daniel Halbach, Berlin (DE); Nitin Giri, Bothell, WA (US); Edwin Ricardo Mendez Rodriguez, Seattle, WA (US); Matthew Jonathan Narksusook, Auburn, WA (US)

(73) Assignee: Amazon Technologies, Inc., Seattle, WA (US)

( * ) Notice: Subject to any disclaimer, the term of this patent is extended or adjusted under 35 U.S.C. 154(b) by 387 days.

(21) Appl. No.: 17/710,551

(22) Filed: Mar. 31, 2022

(65) Prior Publication Data
US 2023/0316445 A1  Oct. 5, 2023

(51) Int. Cl.
*G06Q 50/26* (2024.01)
*B60W 50/04* (2006.01)
(Continued)

(52) U.S. Cl.
CPC ......... *G06Q 50/265* (2013.01); *B60W 50/045* (2013.01); *G06F 16/2365* (2019.01); *H04W 4/021* (2013.01); *H04W 12/64* (2021.01)

(58) Field of Classification Search
CPC .. G06F 16/29; G06F 2221/2117; G06F 21/10; G06F 16/27; G06F 21/6245; G06F 2203/0383; G06F 21/6227; G06F 40/166; H04W 4/38; H04W 4/021; H04W 4/027; H04W 12/06; H04W 12/03; H04W 8/22; H04W 24/02; H04W 48/08; H04W 4/023;
(Continued)

(56) References Cited

U.S. PATENT DOCUMENTS 10,332,320 B2   6/2019  Lakshamanan
11,032,665 B1 * 6/2021  George ........... H04W 36/00835
(Continued)

OTHER PUBLICATIONS

International Search Report and Written Opinion mailed Jun. 22, 2023 in PCT/US2023/015995, Amazon Technologies, Inc.
(Continued)

*Primary Examiner* — Kwasi Karikari
(74) *Attorney, Agent, or Firm* — Alexander A. Knapp; Kowert, Hood, Munyon, Rankin & Goetzel, P.C.

(57) ABSTRACT

A vehicle data management system and data jurisdiction system manage vehicle data between multiple jurisdictions and enables a set of jurisdiction rules involving rules of various jurisdictions to be applied consistently. The vehicle data jurisdiction system can detect changes in jurisdiction of a vehicle based on various pieces of received vehicle information and applies appropriate jurisdiction rules from a set of jurisdiction rules. Various jurisdictions may have conflicting jurisdiction rules and, in such circumstances, the data jurisdiction system resolves potential conflicts between the rules using a jurisdiction rules resolution workflow. Based on the resolution of the conflict, the data jurisdiction system can migrate data of the vehicle to one or more other jurisdictions, or otherwise implement the correct rules determined by resolving the conflict.

20 Claims, 15 Drawing Sheets

(51) Int. Cl.
*G06F 16/23* (2019.01)
*H04W 4/021* (2018.01)
*H04W 12/64* (2021.01)

(58) Field of Classification Search
CPC ... H04W 12/02; H04W 40/20; H04W 64/003; H04W 64/00; H04W 12/00; H04W 4/025; H04W 28/0226; H04W 24/00; H04W 8/08

See application file for complete search history.

(56) References Cited

U.S. PATENT DOCUMENTS

| | | | |
|---|---|---|---|
| 11,441,916 B1 | 9/2022 | Konrardy | |
| 11,468,285 B1 | 10/2022 | Tang | |
| 2011/0131666 A1* | 6/2011 | Tanaka | G07C 5/085 726/30 |
| 2013/0151135 A1 | 6/2013 | Aubrey | |
| 2019/0384870 A1 | 12/2019 | Shiraishi et al. | |
| 2021/0144517 A1 | 5/2021 | Guim Bernat | |
| 2021/0272394 A1 | 9/2021 | Cella | |
| 2022/0038872 A1 | 2/2022 | Lu | |
| 2022/0080977 A1 | 3/2022 | Ucar | |
| 2022/0250636 A1 | 8/2022 | Ucar | |
| 2022/0260989 A1 | 8/2022 | Lepird | |
| 2022/0402519 A1 | 12/2022 | Schoning | |
| 2023/0315717 A1 | 10/2023 | Mesde et al. | |
| 2023/0316770 A1 | 10/2023 | Mesde et al. | |
| 2024/0096104 A1 | 3/2024 | Mesde et al. | |

OTHER PUBLICATIONS

Ghanishtha Bhatti, et al: "Towards the future of smart electric vehicles: Digital twin technology", Renewable and Sustainable Energy Reviews, vol. 141, Feb. 17, 2021, pp. 1-18.

U.S. Appl. No. 17/037,376, filed Sep. 29, 2020, Michael Garcia, et al.

U.S. Appl. No. 17/160,184, filed Jan. 27, 2021, Assimakis Tzamaloukas, et al.

Stefan Boschert, "Next Generation Digital Twin," Conference Paper May 2018, ResearchGate, in Proceedings of TMCE 2018, pp. 209-218.

U.S. Appl. No. 17/710,585, filed Mar. 31, 2022, Roland Mesde, et al.

U.S. Appl. No. 17/710,634, filed Mar. 31, 2022, Roland Mesde, et al.

U.S. Appl. No. 17/710,644, filed Mar. 31, 2022, Roland Mesde, et al.

* cited by examiner

VEHICLE DATA JURISDICTION MANAGEMENT

BACKGROUND

In recent years, increases in adoption of technologies such as distributed cloud computing as well as the digitization of various industries has led to data becoming a crucial component of the modern global economy. Along with the rise in the importance of data, there has also been a rise in the interest of various jurisdictions, such as countries, to regulate the storage and transfer of data. One such regulation is data residency. Data residency is the requirement that data processed and stored in an information technology (IT) system must remain within a specific jurisdiction's borders. Other such regulations deal with data retention and data privacy. For example, different jurisdictions may have different rules regarding retention and/or use of data. Such requirements or rules affect the use of IT infrastructure and impacts operations to create, process, store, secure, and exchange electronic data, including data concerning vehicles.

Figure 1:
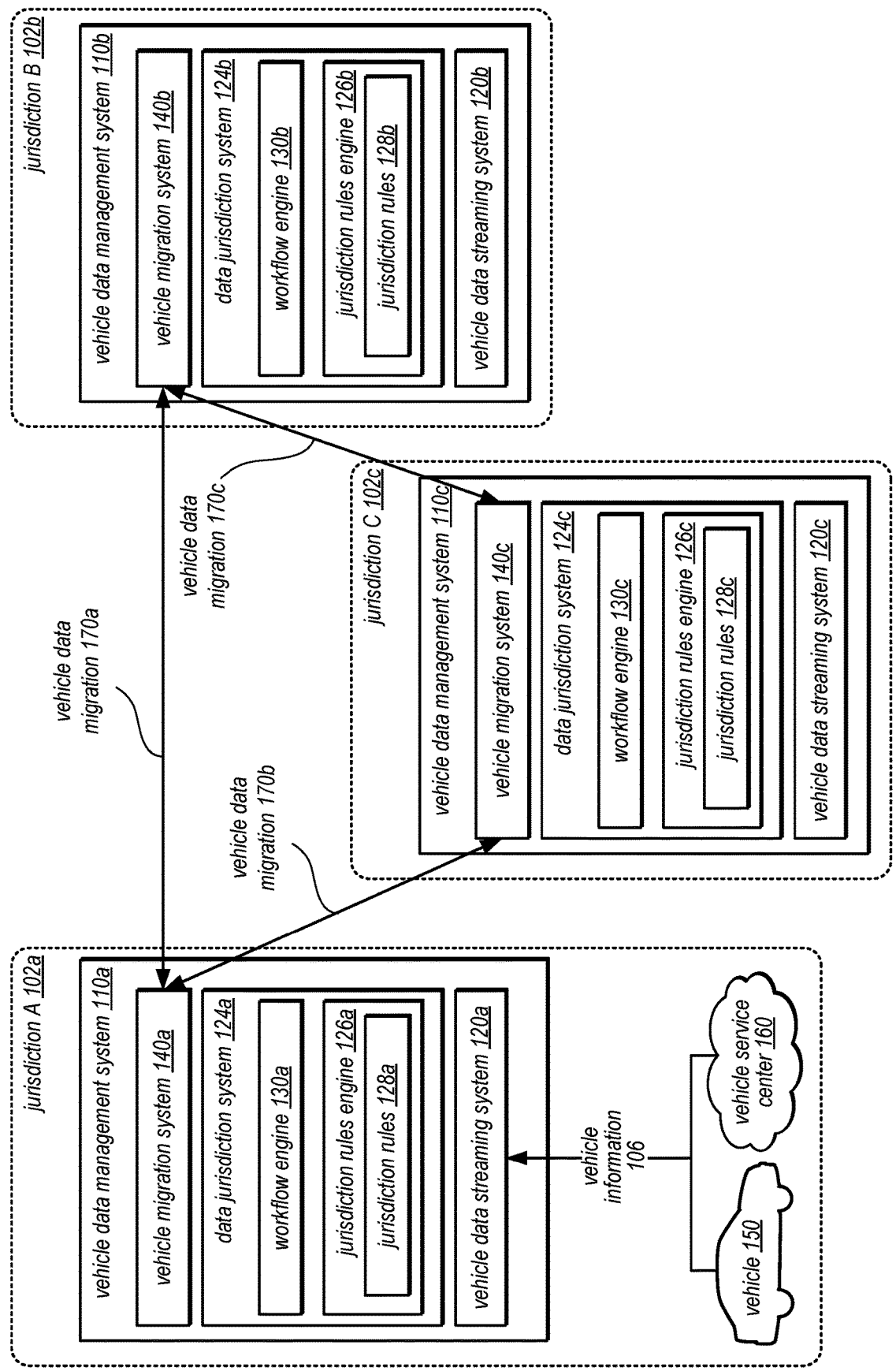
FIG. 1 illustrates a vehicle data management system and a data jurisdiction system that determine a change in jurisdiction of a vehicle. The data jurisdiction system determines one or more actions to take in response to the change in jurisdiction of the vehicle based on a set of jurisdiction rules. Additionally, the data jurisdiction system resolves conflicts between jurisdiction rules of different jurisdictions, and the data management system migrates data of the vehicle to one or more other jurisdictions, if applicable, in accordance with the de-conflicted jurisdiction rules, according to some embodiments.

While embodiments are described herein by way of example for several embodiments and illustrative drawings, those skilled in the art will recognize that embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein include techniques for implementing a vehicle data jurisdiction system for managing vehicle data between multiple jurisdictions. With the rise in the importance of data in the modern economy, as well as with the increase in complexity of computing environment of the modern economy, public sector organizations have voiced concerns about the security, retention, and/or sharing of their data. As a result, some governments have determined that mandating data residency, the requirement that data content be processed and stored in an IT system within a specific jurisdiction's borders, provides an extra layer of security. Also, some countries, have mandated protections related to privacy, such as restrictions on data retention or sharing. Data residency and data privacy reflect a combination of issues primarily associated with security risks and privacy risks associated with third-party access to data. Data residency and data privacy rules particularly effect multinational cloud service providers (CSPs), having infrastructure assets located in various countries as data residency and/or privacy requirements impact operations to create, process, store, secure, and exchange many forms of electronic data between the cross-border infrastructure assets. The various data storage and transfer rules furthermore may be in conflict with one another—thus creating a need to find a way to resolve such conflicts. The various jurisdictions' data policies affect many types of data including data generated or associated with vehicles.

Modern vehicles, such as cars, trucks, motorcycles, etc. are often manufactured with electronic sensors and include computer systems programmed with control algorithms that take inputs from such electronic sensors to determine various control actions to be taken for the vehicle or systems implemented in the vehicle. Some vehicles may include as many as 70 such electronic control units (ECUs) and 20-30 sensor modalities or more. Additionally, modern vehicles increasingly depend on sensors that generate more data than previous vehicles. For example, autonomous, semi-autonomous, or self-driving vehicles may include multiple cameras, radars, audio microphones, etc. Such sensors may generate significant amounts of data that may be stored in various jurisdictions. However, data localization rules may require a vehicle associated with a given jurisdiction's citizens/residents or vehicles located within the given jurisdiction's geography to be collected, processed, and/or stored inside that jurisdiction or in accordance with jurisdiction specific data retention and/or sharing rules. For example, a jurisdiction such as Country A may require vehicle data to be stored inside the country and require security assessment by governmental authorities to be conducted before being transferred out of the country. In addition to the increasing amount of data, as modern vehicles, such as cars, trucks, motorcycles, etc. become more advanced, they are increasingly equipped with electronic sensors which are utilized for various cloud applications, such as virtual electronic control units (virtual ECUs) that remotely provide computing resource to the vehicle. In the context of data captured from sensors in a vehicle, complying to these rules can be difficult because a vehicle may move across borders into a new jurisdiction and be registered in a new location. Also, since vehicles are mobile, such jurisdiction changes may be performed repeatedly. Therefore, the application of various jurisdiction rules and the resulting migration of vehicle data to the correct jurisdiction pose a non-trivial problem.

A data jurisdiction system may provide a mechanism for various connected vehicle services to comply with data localization, retention, and/or privacy rules. The data jurisdiction system may allow connected vehicle services located in different jurisdictions to be interconnected, and to automatically detect vehicle signals or other vehicle information that may be used to determine a change in a vehicle's jurisdiction. A vehicle data streaming system may manage the pipeline/flow of vehicle data from external sources, including the vehicle or associated vehicle service centers, and send the information to the data jurisdiction system. The data jurisdiction system (as part of, or independent from, a vehicle data management service) may interconnect instances of the vehicle data management services located in different jurisdictions (data centers and/or availability zones) and facilitate the movement of vehicle data between the jurisdictions based on a set of jurisdiction rules. The jurisdiction rules may be associated to legal requirements for each jurisdiction regarding the storage, processing, retention, sharing, and/or transfer of vehicle data. Because many jurisdictions have designated independent jurisdiction rules that vary from jurisdiction to jurisdiction there may be conflicts amongst the jurisdiction rules. When conflicts between jurisdiction rules arise, the data jurisdiction system may resolve conflicts using a conflict resolution workflow and determine the correct jurisdiction rules to apply.

Once the jurisdiction rules to be applied are been determined, a data migration system, which regulates the flow of data between jurisdictions, manages migration jobs and routing rules to automatically delete, transfer or retain the appropriate vehicle data as required by the jurisdiction rules. A routing rule is a configuration that allows the data migration system to divert or copy data flowing through a vehicle data streaming system in one jurisdiction to a counterpart in another jurisdiction. A migration job is a task to delete, partially or fully copy, or partially or fully move data persisted in one jurisdiction, such as a vehicle shadow, to another jurisdiction, such as a vehicle shadow in another jurisdiction. The interconnected data jurisdiction system may maintain a single synchronized view of the corpus of Vehicle Identity Numbers (VINs), the current associated jurisdiction for each VIN, and the jurisdictions that have data associated to each VIN. This can be used by the data jurisdiction system to determine, for a vehicle or external applications (e.g., mobile application) an appropriate jurisdiction to connect to.

FIG. 1 illustrates a vehicle data management system and data jurisdiction system that determines a change in the jurisdiction of a vehicle, resolves conflicts between jurisdiction rules (if necessary), and retains, deletes, or migrates data of the vehicle to one or more other jurisdictions, in accordance with the jurisdiction rules. Various vehicle data management systems 110a, 110b, and 110c may be located in two or more jurisdictions, such as jurisdiction A 102a, jurisdiction B 102b, and jurisdiction C 102c. The various jurisdictions may be a geographical area or territory within which authority to impact management of vehicle data are exercised. In some embodiments, the jurisdictions may be based on a country representing a distinct sovereign political entity such as the United States. In other embodiments, the jurisdictions may be based on states or localities that subdivide the country into separate jurisdictions such as California and San Francisco. Jurisdictions may further be comprised of multiple countries or states as well as be comprised of any number and/or combination of the various territories, such as the European Union. In some embodiments, there may be jurisdictions that have overlapping authority to impact the management of vehicle data.

The vehicle data management systems 110a, 110b, and 110c may be comprised of respective vehicle data streaming systems 120a, 120b, and 120c, data jurisdiction systems 124a, 124b, and 124c, and vehicle migration systems 140a, 140b, and 140c. Although FIG. 1 depicts the respective vehicle data management systems 110a, 110b, and 110c as being comprised of the respective components, the respective systems comprising the vehicle data management system may be outside of and independent from the vehicle data management systems 110a, 110b, and 110c.

In some embodiments a vehicle 150 may generate one or more vehicle information 106 to send to the vehicle data streaming system 120a. The vehicle 150 may send vehicle information 106 containing data such as video frames, images, radar amplitude, temperature data, engine speed, and other information about the vehicle 150. The vehicle information 106 may include Global Positioning System (GPS) information determined using cellular, wireless passive, satellite, and other types of GPS systems. In some embodiments, a geographic location of a vehicle 150 may be determined in a variety of manners. For example, in some embodiments, a GPS may be used or a global navigation satellite system (GNSS) may be used. In some embodiments, a vehicle may determine its location using local sensors and/or algorithms, such as using computer vision, light detection and ranging (LIDAR), vehicle odometry, etc.

Although FIG. 1 depicts only the vehicle 150 and a vehicle service center 160 as generating the vehicle information 106, any number of data sources inside or outside of the jurisdiction may contribute to the vehicle information 106 sent to the vehicle data streaming system 120a. The vehicle data streaming system 120a may, in various embodiments, be an apparatus or system for managing the creation, storage, retrieval, and processing of large-scale vehicle data streams. The vehicle data streaming system 120a may be designed to handle hundreds or even thousands of concurrent data producers and data consumers. The term "data stream", as used herein, refers to a sequence of vehicle data records that may be generated by one or more data producers (e.g., vehicle 150, vehicle service center 160) and accessed by one or more data consumer.

Once the vehicle data streaming system 120a receives the vehicle information 106 it may use the vehicle information 106 to detect a jurisdiction change event. In some embodiments the detection of the change in jurisdiction of the vehicle 150 may be performed by the data jurisdiction system 124a, instead of the vehicle data streaming system 120a. The jurisdiction change event may be inferred or deduced based upon a single clear indication of vehicle jurisdiction change such as registration information change from the vehicle service center 160. In some embodiments, the jurisdiction change event may be detected based on a plurality of vehicle information signals such as GPS signals, vehicle service information, vehicle location history, etc. The jurisdiction change event furthermore may be detected or inferred based on one or more machine learning models trained using a past history of vehicle information 106 and jurisdiction rules 128a and will be further discussed in FIGS. 2 and 3.

The detected jurisdiction change event is then sent or requested by the data jurisdiction system 124a, and the data jurisdiction system 124a applies a set of jurisdiction rules 128a to initiate vehicle data migrations 170a, 170b, 170c respectively. Though in some embodiments, application of the set of jurisdiction rules may result in continued retention of vehicle data or deletion of vehicle data with or without migration. The data jurisdiction system 124a may comprise a workflow engine 130a and jurisdiction rules engine 126a. The jurisdiction rules engine 126a may have access to the set of jurisdiction rules 128a and may utilize the jurisdiction rules 128a to determine whether one or more portions of the vehicle data stored for the vehicle 150 is to be deleted, moved, or retained in a certain jurisdiction. The set of jurisdiction rules 128a may comprise various data storage/transfer requirements of the one or more jurisdictions. The jurisdiction rules 128a may include rules that are based on jurisdiction a change event (e.g., a change in jurisdiction from jurisdiction A to jurisdiction B causes data migration to jurisdiction B), based on data types (e.g., vehicle user identification data, vehicle location data, vehicle camera data are allowed to be migrated), based on jurisdictions (e.g., data migration to jurisdiction B is forbidden), or any combination thereof. For example, one jurisdiction rule may require GPS vehicle data to be migrated to jurisdiction B 102b upon detection of the jurisdiction change trigger event to jurisdiction B 102b. The jurisdiction rules 128a, 128b, and 128c may be added, removed, or modified and may be synchronized between multiple jurisdictions. The synchronization of jurisdiction rules 128a, 128b, and 128c is further discussed in FIG. 4A.

Once the jurisdiction rules to apply to the vehicle data have been determined, the workflow engine 130a creates a routing rule and/or a migration job for the data migration system 140a. The data migration system 140a receives a migration notice from the data jurisdiction management system 130a that identifies the one or more portions of the vehicle data to be moved. The migration of vehicle data may involve vehicle migration system 140a, 140b, and 140c of respective jurisdictions 102a, 102b, and 102c. In some embodiments, the data migration system 140a may transfer the vehicle data in batches. The jurisdiction rules engine 126a may, based on a set of jurisdiction rules 128a, determine whether one or more portions of the data of the vehicle 150 should be deleted, moved, or retained. The data migration system 140a, based on the received migration notice, moves the one or more portions of the vehicle data stored in jurisdiction A 102a to jurisdiction B 102b. The workflow engine 130a, in some embodiments, communicates with other data jurisdiction systems where data pertaining to the associated VIN is stored. The workflow engine 130a may reconcile applicable rules and the priorities associated to respective vehicle data to determine a migration strategy to be implemented in all of the affected jurisdictions.

In some embodiments, the jurisdiction rules engine 128a may determine that a jurisdiction conflict exists between one or more rules of the set of jurisdiction rules 128a that have been selected to be applied. The jurisdiction rules engine 126a may initiate a jurisdiction conflict resolution workflow to resolve the conflict. The workflow engine 130a may resolve the conflict between the jurisdiction rules 128a using a predetermined prioritization scheme. In some embodiments, a manual resolution may be required in the conflict resolution workflow where the conflict is presented to a user via a user interface and a user decision is received. Based on the user decision, the workflow engine 130a may resolve the conflict. The conflict resolution workflow is further discussed in FIGS. 8 and 9.

Figure 2:
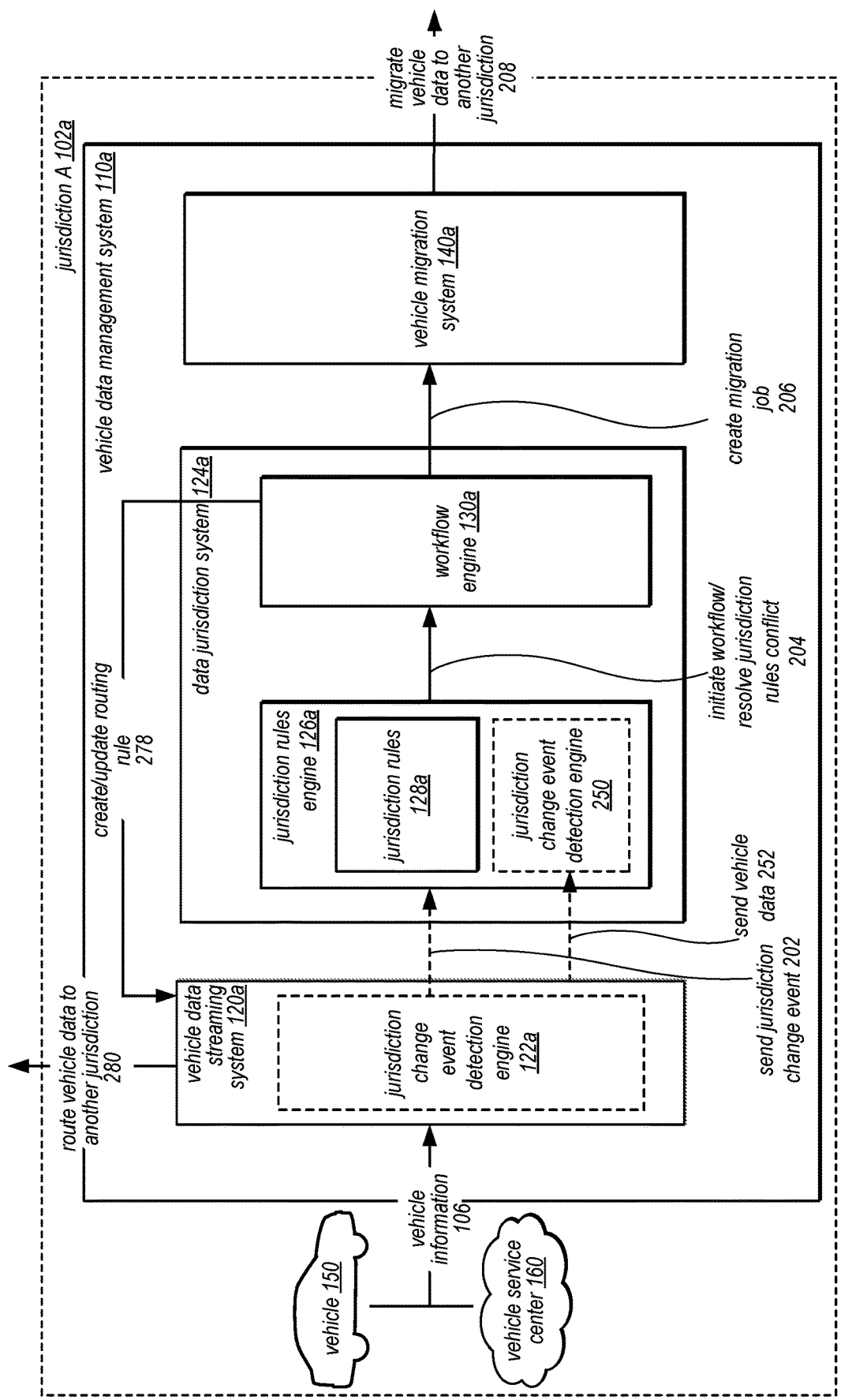
FIG. 2 illustrates a more detailed view of the data jurisdiction system that determines a change in the jurisdiction of a vehicle, determines actions to take based on a set of jurisdiction rules, resolves conflicts between the jurisdiction rules, and causes data of the vehicle to be migrated to one or more other jurisdictions, according to some embodiments.

FIG. 2 illustrates a more detailed view of the data jurisdiction system that determines a change in the jurisdiction of a vehicle, resolves conflicts between jurisdiction rules, and migrates data of the vehicle to one or more other jurisdictions.

In FIG. 2, the vehicle 150 and vehicle service center 160 may send the vehicle information 106 to the vehicle data streaming system 120a as described in FIG. 1. In some embodiments the vehicle data streaming system 120a may include a jurisdiction change event detection engine 122a that detects a jurisdiction change event of the vehicle 150. The jurisdiction change event detection engine 122a may interpret one or more vehicle information 106 to detect a jurisdiction change event and based on the jurisdiction change, send to the jurisdiction rules engine 126*a* a jurisdiction change event 202. Although the vehicle data streaming system 120*a* is shown in FIG. 1 as being part of the vehicle data management system 110*a*, the vehicle data streaming system 120*a* may be a separate system outside the vehicle data management system 110*a*. The jurisdiction change event 202 may be communicated to the jurisdiction rules engine 126*a* using an application programming interface (API) call, sending one or more messages containing the jurisdiction change event, or other communication protocols. The jurisdiction change event comprises vehicle identification information such as a VIN, vehicle jurisdiction prior to the jurisdiction change event, and vehicle jurisdiction subsequent to the jurisdiction change event. The jurisdiction change event may further comprise descriptions of the one or more vehicle information 106 that was used to detect the jurisdiction change event.

In some embodiments the jurisdiction change event detection engine 122*a* may be part of the jurisdiction rules engine 126*a* instead of the vehicle data streaming system 120*a*. The vehicle data streaming system 120*a* sends vehicle data 252 to the jurisdiction change event detection engine 122*a*. Furthermore, the jurisdiction change event detection engine 122*a* may determine that the jurisdiction change event 202 has occurred. Once the jurisdiction change event is detected, the jurisdiction rules engine 126*a* uses the jurisdiction change event to determine the appropriate jurisdiction rule (s) of the set of jurisdiction rules 128*a* to apply. As described in FIG. 1, the jurisdiction rules 128*a* may comprise rules based on various data storage/transfer requirements of one or more jurisdictions. The jurisdiction rules 128*a* may include rules that are based on jurisdiction change, based on vehicle information, based on vehicle jurisdictions, or any combination therein. The jurisdiction rules 128*a* may be added, removed, or modified and may be synchronized between multiple jurisdictions. The jurisdiction rules engine 126*a* determines the jurisdiction rules 128*a* to apply based on the vehicle information, the past jurisdiction, and the current jurisdiction.

In some embodiments the jurisdiction rules engine 126*a* initiates a workflow for the workflow engine 130*a* to create/update routing rule 278 and/or migration job 206. Once the jurisdiction rules to apply to the vehicle data have been determined, the workflow engine 130*a* creates a routing rule 278 for the vehicle data streaming system 120*a* and/or a migration job for the data migration system 140*a*. The vehicle migration system 140*a* migrates vehicle data to another jurisdiction 208 as determined by the workflow engine according to the jurisdiction rules 128*a*. In some embodiments, the vehicle data streaming system 120*a* routes incoming vehicle information to another jurisdiction 280 based on the routing rule 278 as determined by the workflow engine 130*a* according to the jurisdiction rules 128*a*. The routing rules may contain various parameters to route incoming vehicle information 106 such as, duration, vehicle information type, jurisdiction destination, VIN, etc.

Figure 3:
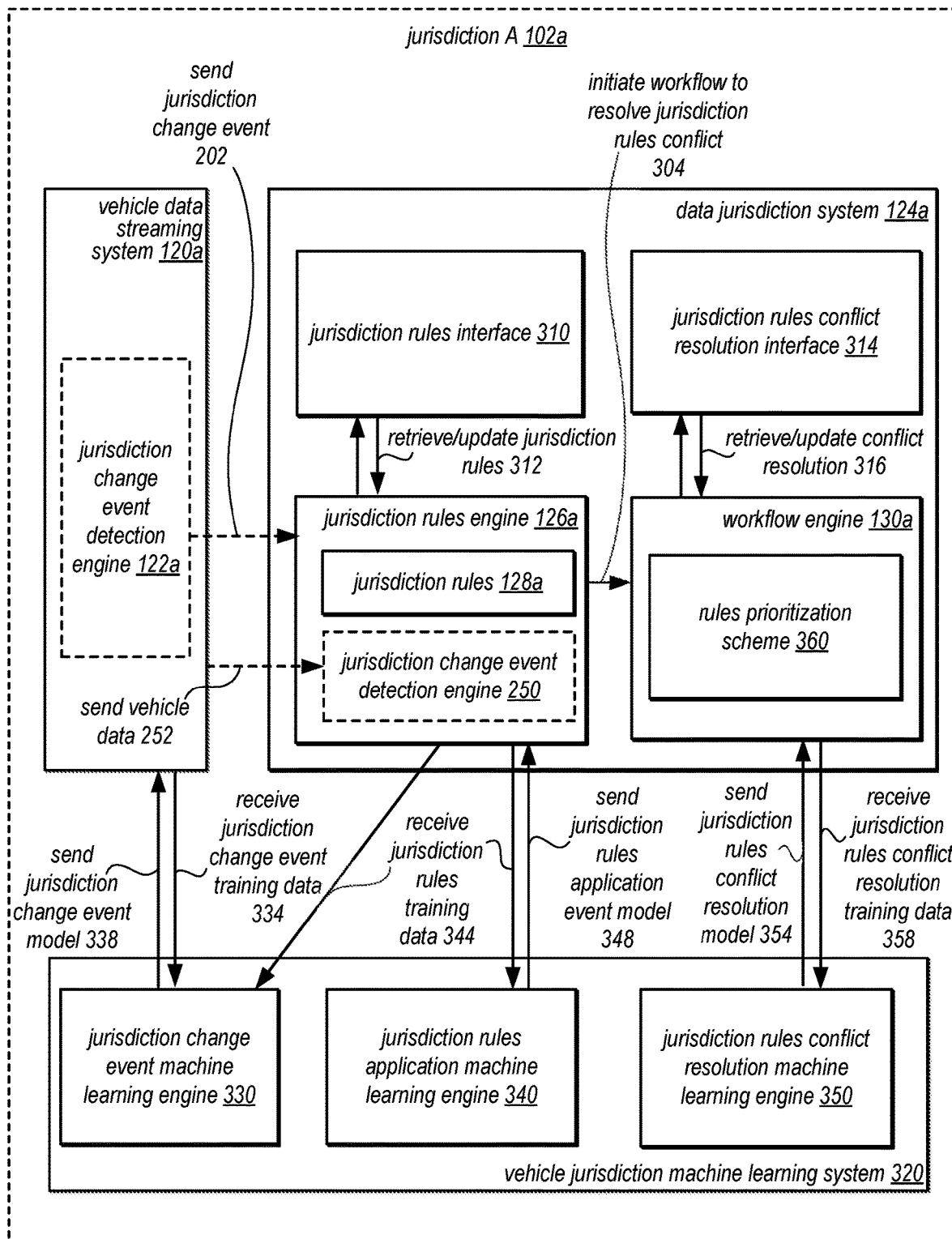
FIG. 3 illustrates a logical block diagram illustrating various components of a data jurisdiction system, a vehicle data streaming system, and a vehicle jurisdiction machine learning system, according to some embodiments.

FIG. 3 illustrates a logical block diagram illustrating various components of a data jurisdiction system, vehicle data streaming system, and vehicle jurisdiction machine learning system, according to some embodiments.

As discussed in FIG. 2, the jurisdiction change event detection engine 122*a* may be part of the vehicle streaming system 120*a* or part of the jurisdiction rules engine 126*a*. Depending on the orientation, the vehicle data streaming system 122*a* may send the jurisdiction change event 202 to the jurisdiction rules engine 126*a*, or the vehicle data streaming system 120*a* may send vehicle data 252 to the jurisdiction change event detection engine 250 in the jurisdiction rules engine 126*a* to detect a jurisdiction change event. In some embodiments, a jurisdiction change event machine learning engine 220 of a vehicle jurisdiction machine learning system 320 may receive jurisdiction change event training data 334 from the vehicle data streaming system 334. The received jurisdiction change event training data 334 may be used to train a machine learning model to determine that the jurisdiction change even has occurred. The received jurisdiction change event training data 334 may include past history or a generated set of various types of vehicle information, including GPS data, vehicle registration information, or vehicle servicing information. The jurisdiction rules training data 344 may further include information associated with past jurisdiction change events (for such vehicle identification information of the vehicles having undergone a jurisdiction change event), associated vehicle information, and the jurisdiction rules applied. The jurisdiction change event model 338 may be sent to the vehicle data streaming system 120*a* or the jurisdiction rules engine 126*a*. The sent jurisdiction change event model 338 may be used to determine whether one or more of the received vehicle information results in a jurisdiction change event.

In some embodiments, the data jurisdiction system 124*a* may include a jurisdiction rules interface 328*a* that may retrieve/update jurisdiction rules 312 in the jurisdiction rules engine 126*a*. The jurisdiction rules interface 328*a* may retrieve the set of jurisdiction rules 128*a* stored in the jurisdiction rules engine 126*a* and may further provide an interface to add, delete, or modify one or more of the jurisdiction rules of the set of jurisdiction rules. In some embodiments, the updates to the jurisdiction rules 128*a* may be propagated to other locally stored copies of the set of jurisdiction rules stored in various other jurisdictions and is further discussed in FIG. 4A.

In some embodiments, the vehicle jurisdiction machine learning system 320 may further comprise a jurisdiction rules application machine learning engine 340 that receives the jurisdiction rules training data 344 of vehicle information associated with past jurisdiction change events similar to that provided to the jurisdiction change event machine learning engine 330. The jurisdiction rules training data 344 may include vehicle identification information of the vehicles that have undergone jurisdiction change events, their associated vehicle information, and the jurisdiction rules applied. The jurisdiction rules application machine learning engine 340 may be used to train a machine learning model to determine the jurisdiction rules to apply to the vehicle based on the jurisdiction change event. The jurisdiction rules application machine learning engine 340 sends the jurisdiction rules application event model 348 to the jurisdiction rules engine 126*a*, wherein the said trained model may be used to determine which jurisdiction rules 128*a* to apply to the vehicle that has undergone a jurisdiction change event.

The jurisdiction rules engine 126*a* may initiate a workflow to resolve jurisdiction rules conflict 304 upon a detection of one or more jurisdiction rules conflicts amongst the jurisdiction rules 128*a* determined to be applied for the vehicle data. In some embodiments, the workflow engine may determine which of the jurisdiction rules to apply amongst the conflicting rules using predetermined conflict resolution mechanism such as a predetermined prioritization scheme 360. The predetermined prioritization scheme 360 may be a set of instructions on how conflicting jurisdiction rules 128a are to be resolved based on various factors such as jurisdiction rules type, vehicle identification information, and vehicle data affected. The predetermined prioritization scheme 360 may determine which of the one or more jurisdiction rules 128a of the conflicting rules to apply to one or more data of the vehicle. In some embodiments, the resolution of the jurisdiction rules may involve partial application of the one or more conflicting rules. The workflow engine 130a reconciles applicable rules and the priorities associated to them in order to determine the migration strategy that is to be implemented in multiple affected jurisdictions, and not to just jurisdiction A 102a.

In some embodiments, instead of, or in conjunction with, the rules prioritization scheme 360, a manual resolution may be used in the workflow to resolve conflicts. A jurisdiction rules conflict resolution interface 314 of the data jurisdiction system 124a may be used to retrieve/update conflict resolution 316. In some embodiments a jurisdiction rules conflict resolution interface 314 may be used to provide an interface to request one or more user decisions to resolve the conflict. The jurisdiction rules conflict resolution interface 314 may request the user to make one or more decisions to resolve jurisdiction conflict, such as selecting between two conflicting jurisdiction rules to apply to the vehicle data or other such relevant decisions that may be used by the workflow engine 130a to resolve the jurisdiction rules conflict. For example, a relevant decision may furthermore include a ranking of priority of the jurisdiction rules, determination of significance of the vehicle data, determination on the threshold transfer cost of the vehicle data affected, etc. The conflict resolution workflow is further discussed in FIG. 9.

In some embodiments, the vehicle jurisdiction machine learning system 320 may further comprise a jurisdiction rules conflict resolution machine learning engine 350 that receives the jurisdiction rules conflict resolution training data 358 and sends a jurisdiction rules conflict resolution model 354 to the workflow engine 130a. The jurisdiction rules conflict resolution training data 358 may include data associated with the resolution of the jurisdiction conflict such as past history of conflict resolution between the one or more jurisdictions, their relevant jurisdiction rules, their vehicle identity information and affected vehicle data. Furthermore, the jurisdiction rules conflict resolution training data 358 may include past history of user decisions from the jurisdiction rules conflict resolution interface 314 such as selection between two conflicting jurisdiction rules, ranking of priority of the jurisdiction rules, and determination of significance of the vehicle data as discussed above. The jurisdiction rules conflict resolution machine learning engine 350 may use the received jurisdiction rules conflict resolution training data 358 to generate a jurisdiction rules conflict resolution model 354. The jurisdiction rules conflict resolution machine learning engine 350 sends the jurisdiction rules conflict resolution model 354 to the workflow engine 130a, wherein the said trained model may be used as part of the conflict resolution mechanism to resolve the jurisdiction rules conflict. Once the jurisdiction rules conflicts are resolved and the jurisdiction rules to apply have been determined, the workflow engine creates a routing rule and/or a migration job for the data migration system based on the jurisdiction rules.

Figure 4A:
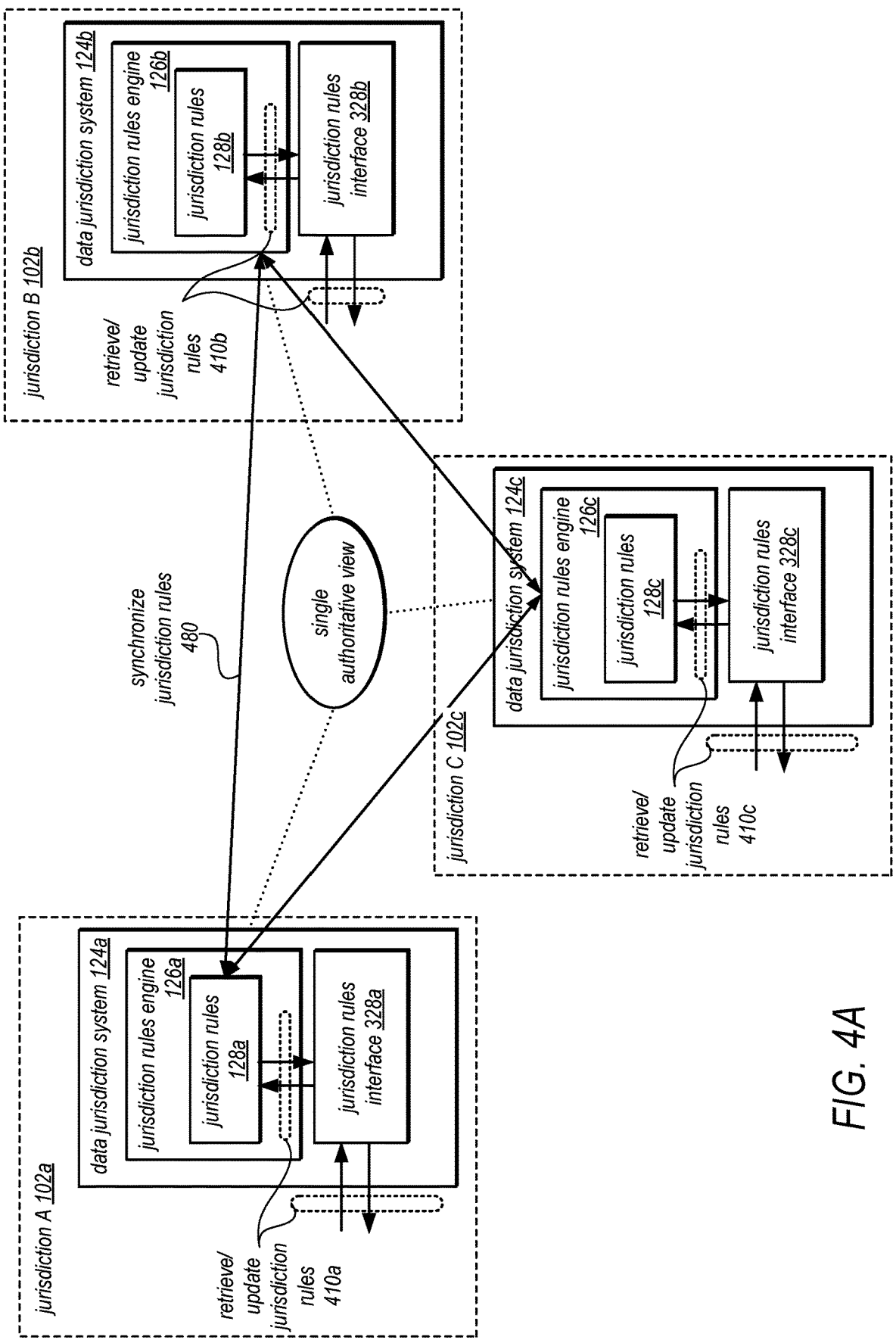
FIG. 4A illustrates a more detailed view of the data jurisdiction system including a jurisdiction rules interface that enables updating of jurisdiction rules and conflict resolution of jurisdiction rules to provide a single authoritative view of the judication rules, according to some embodiments.

FIG. 4A illustrates a more detailed view of the data jurisdiction system including jurisdiction rules interface that synchronizes jurisdiction rules to provide a single authoritative view of the judication rules.

The data jurisdiction systems 124a, 124b, and 124c, in respective jurisdiction A 102a, jurisdiction B 102b, and jurisdiction C 102c may be interconnected to provide a single authoritative view of the jurisdiction rules. The respective jurisdiction rules engine 126a, 126b, and 126c may synchronize jurisdiction rules 480 to maintain a single authoritative view of the various sets of jurisdiction rules 128a, 128b, and 128c in multiple jurisdictions. Any of the respective changes to the jurisdiction rules 128a, 128b, and 128c by the respective jurisdiction rules interface 328a, 328b, and 328c will trigger the jurisdiction rules engines 126a, 126b, and 126c to synchronize the jurisdiction rules 480 with counterparts in other jurisdictions such that they are consistent with the respective updates. The locally stored copies of the set of jurisdiction rules 128a, 128b, and 128c stored in the respective jurisdictions may synchronize and provide a single authoritative view using various methods. For example, the single authoritative view of the rules may be provided using multi-primary replication that allows data to be stored and updated by any member of the group. Various methods may be applied to resolve any conflicts that might arise between concurrent changes made by different members. In some embodiments the replication of updates to the jurisdiction rules 410a such as adding, deleting, or modifying one or more of the jurisdiction rules 128a may be replicated asynchronously wherein changes are stored in a queue of the data jurisdiction system 124a then propagated to the others. In some embodiments the replication of various updates to the jurisdiction rules 410a may be performed synchronously wherein the updates are executed at multiple jurisdictions as part of a single transaction. In some embodiments, the multi-primary replication environment providing a single authoritative view of the jurisdiction rules may contain a mixture of both synchronous and asynchronous replication.

Figure 4B:
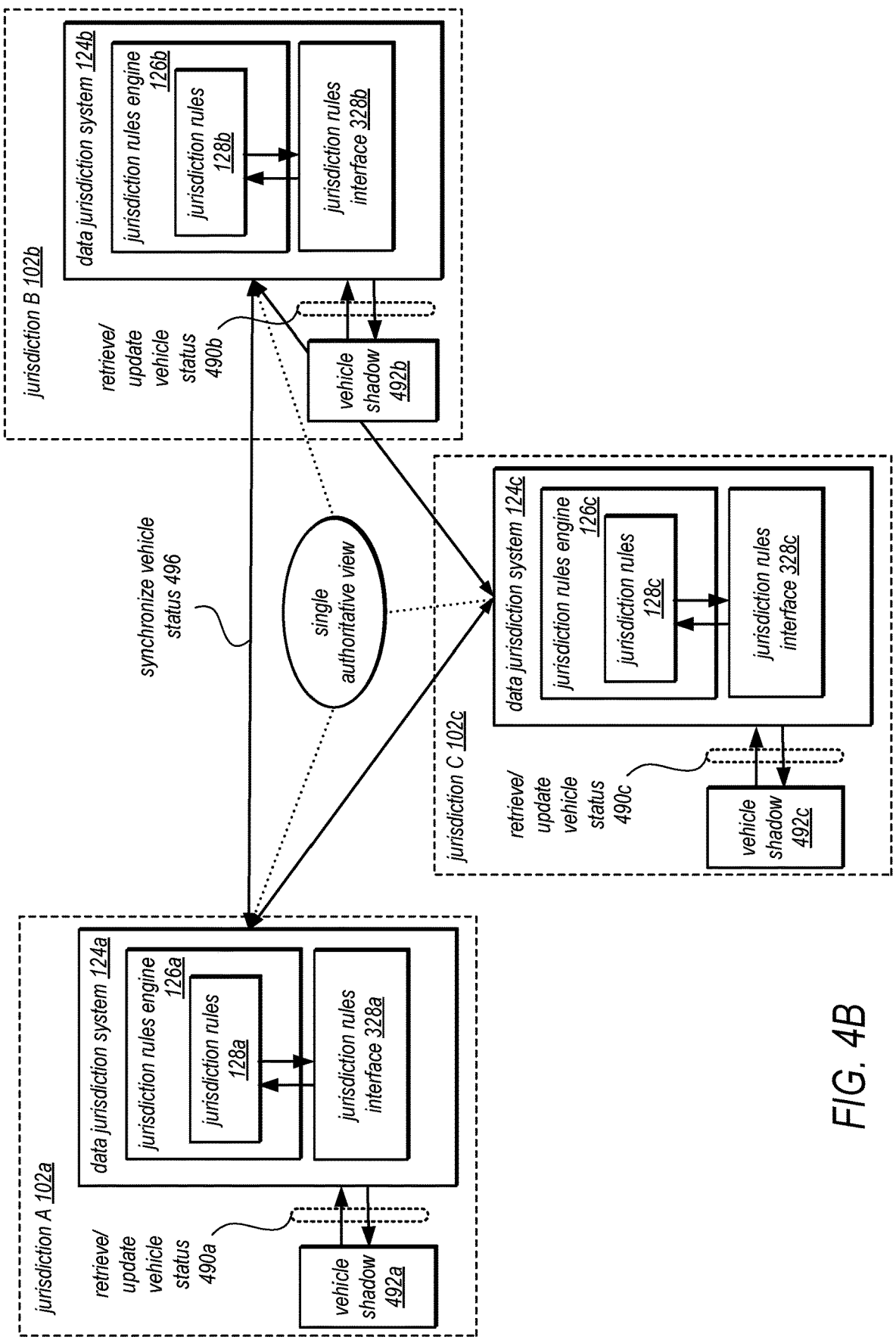
FIG. 4B illustrates a more detailed view of the data jurisdiction system including a vehicle shadow system that synchronizes jurisdiction rules to provide a single authoritative view of the vehicle status, according to some embodiments.

FIG. 4B illustrates a more detailed view of the data jurisdiction system including a vehicle shadow system that synchronizes vehicle shadows to provide a single authoritative view of the vehicle status.

The data jurisdiction systems 124a, 124b, and 124c, in respective jurisdiction A 102a, jurisdiction B 102b, and jurisdiction C 102c may be interconnected to provide a single authoritative view of the vehicle status. The respective jurisdiction rules engine 126a, 126b, and 126c may synchronize vehicle status 496 to maintain a single authoritative view of the vehicle status in multiple jurisdictions. In some embodiments, a respective data jurisdiction system 124a may be associated with a vehicle shadow 492a stored locally in jurisdiction A 102a. A vehicle shadow 492a may be a virtual representation of a physical vehicle. The vehicle shadow 492a may be connected to its associated physical vehicle and may execute a remote command and synchronize vehicle state between the physical vehicle and itself in real time. The vehicle shadow may retrieve/update vehicle status 490a based on its VIN, such as current authoritative jurisdiction and various vehicle attributes including vehicle model, make, vehicle sensor historical status/current status, and vehicle registration information. In some embodiments, in addition to the vehicle information the jurisdiction system 124a, 124b, and 124c may synchronize, information regarding where in the various jurisdictions/locations the portions of the vehicle data are stored may be synchronized.

In some embodiments, changes to the locally stored vehicle shadow 492a may trigger the data jurisdiction system 124a to synchronize vehicle status 496 with counterparts in other jurisdictions such that they are consistent with the respective updates. In some embodiments, the update in vehicle status may be caused by movement of the vehicle data from one jurisdiction to another according to a jurisdiction change of the vehicle. The locally stored copies of the vehicle shadow 492a stored in the respective jurisdictions may synchronize and provide a single authoritative view using various methods. For example, similar to that of FIG. 4A, the single authoritative view of the rules may be provided using multi-leader replication that allows data to be stored and updated by any member of the group. In some embodiments the replication between the locally stored vehicle shadow 492a may be asynchronous wherein updates to the vehicle status 490a are stored in a queue then propagated. In some embodiments, the replication between the locally stored vehicle shadow 492a of various updates to the vehicle status 490 may be synchronous wherein changes are executed at multiple jurisdictions as part of a single transaction. In some embodiments, the multi-leader replication environment providing a single authoritative view of the jurisdiction rules may contain a mixture of both synchronous and asynchronous replication. In some embodiments, instead of a vehicle shadow 492a, other systems providing vehicle status may be synchronized instead of the vehicle shadow, such as a virtual ECU which will be further discussed in FIGS. 6A-6C.

Figure 5:
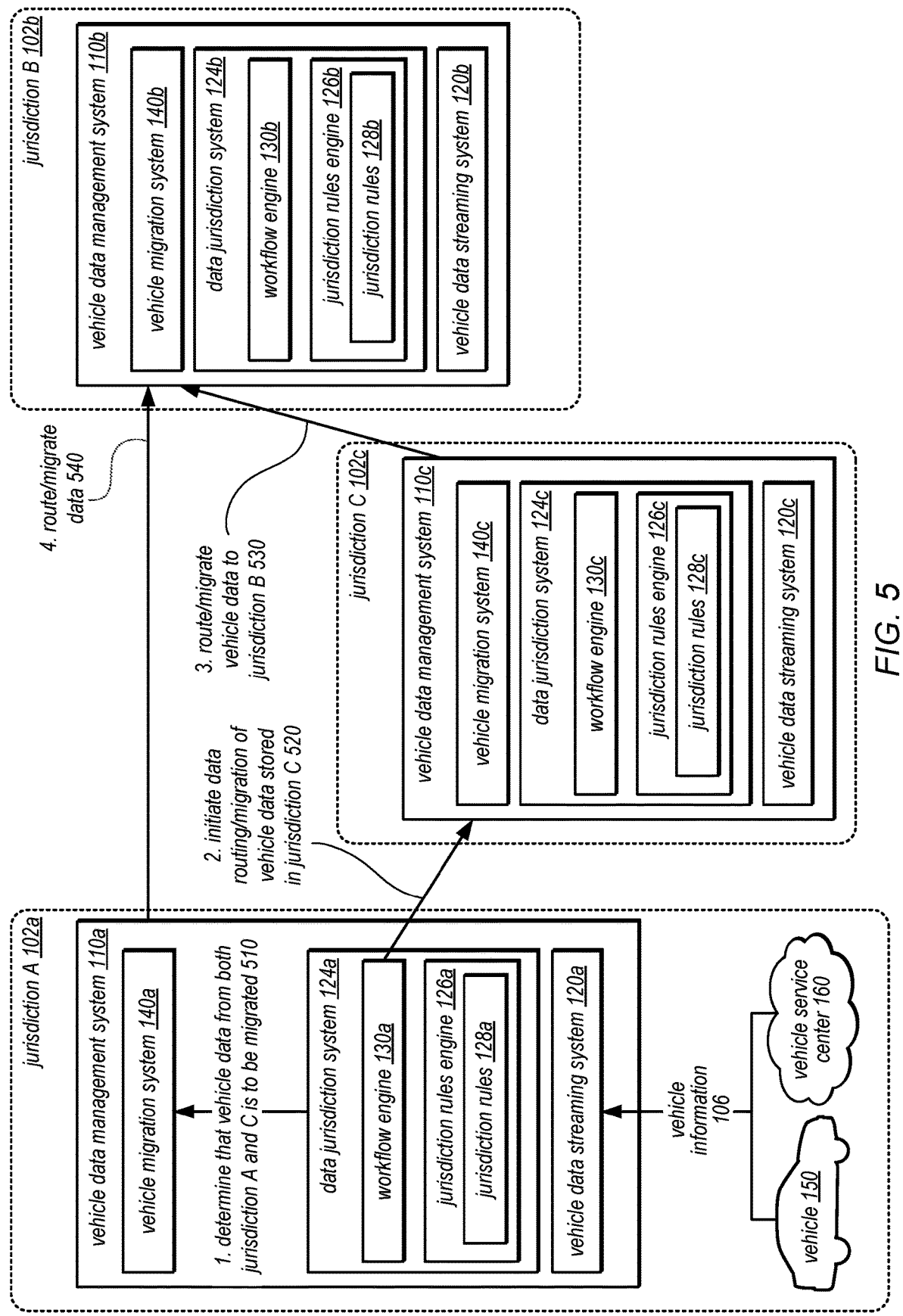
FIG. 5 illustrates a more detailed view of an example use case for the data jurisdiction system, wherein the data jurisdiction system determines a change in the jurisdiction of a vehicle from a first to a second jurisdiction, and causes vehicle data stored in a third jurisdiction to be migrated, according to some embodiments.

FIG. 5 illustrates a more detailed view of the data jurisdiction system that determines a change in the jurisdiction of a vehicle from a first to a second jurisdiction, and causes the jurisdiction system to migrate vehicle data stored in a third jurisdiction.

Similar to FIG. 1, the various vehicle data management systems 110a, 110b, and 110c may be located in two or more jurisdictions, such as jurisdiction A 102a, jurisdiction B 102b, and jurisdiction C 102c. The vehicle data management systems 110a, 110b, and 110c may be comprised of respective vehicle data streaming systems 120a, 120b, and 120c, data jurisdiction systems 124a, 124b, and 124c, and vehicle migration systems 140a, 140b, and 140c. Although FIG. 1 depicts the respective vehicle data management systems 110a, 110b, and 110c as being comprised of the respective components, the respective systems comprising the vehicle data management system may be outside and independent of the vehicle data management system.

In some embodiments the vehicle data streaming system 120a, may receive from the vehicle 150, vehicle service center 160, or other sources, vehicle information that indicates a jurisdiction change even from jurisdiction C 102a to jurisdiction B 102b. In applying the relevant jurisdiction rules 128a and resolving any jurisdiction rules conflict that may occur (as discussed in FIGS. 2 and 3), the jurisdiction system may determine that vehicle data from both jurisdiction A and C are to be migrated 510. The determination may be based on the synchronized vehicle status containing information regarding the locations of the vehicle data. Once the data jurisdiction system 124a determines that the vehicle data from both jurisdiction A and C is to be migrated 510, the workflow engine 130a initiates data routing/migration of vehicle data stored in jurisdiction C 520. In some embodiments there may be a jurisdiction rules conflict between rules concerning jurisdiction C and jurisdiction B. The data jurisdiction system 124a may resolve the jurisdiction rules conflict between various other jurisdiction than the one it is in (i.e., conflict between rules of jurisdiction C and jurisdiction B), through a jurisdiction rules conflict workflow discussed in FIG. 3. In some embodiments, instead of the data jurisdiction system 124a resolving jurisdiction rules conflict, the data jurisdiction system 124c of the subsequent vehicle migration system 140c may resolve conflicts using its workflow engine 130c. The vehicle migration system 140c may cause the one or more portions of the vehicle data stored in jurisdiction C to be deleted, moved to jurisdiction B, or retained in jurisdiction C based on the determination. In some embodiments, the vehicle data streaming system 120c may route incoming vehicle data from jurisdiction C 102c to jurisdiction B 102b based on an output the workflow engine 130a of jurisdiction A 102a. In addition to the data jurisdiction system 124c resolving the jurisdiction rules conflict, in some embodiments the data jurisdiction system 124c may detect jurisdiction rules to apply based on the initiate data migration notice received from workflow engine 130a of jurisdiction A 102a. In other embodiments, the workflow engine 130a indicates to the vehicle data management system 110c, using a routing rule/migration notice, to route/migrate one or more portions of the vehicle data to jurisdiction B as determined by the data jurisdiction system 124a.

The vehicle data management system 110c may route/migrate vehicle data to jurisdiction C 530. The vehicle migration system 140c may cause the one or more portions of the vehicle data stored in jurisdiction C to be deleted and/or moved to a jurisdiction B. Additionally, the vehicle migration system 140a of jurisdiction A 102a may migrate vehicle data 540 to jurisdiction B. The vehicle migration system 140b may then cause the one or more portions of the vehicle data stored in jurisdiction C 102c and jurisdiction A 102a to be copied, partially copied, or refused to be copied.

Figure 6A:
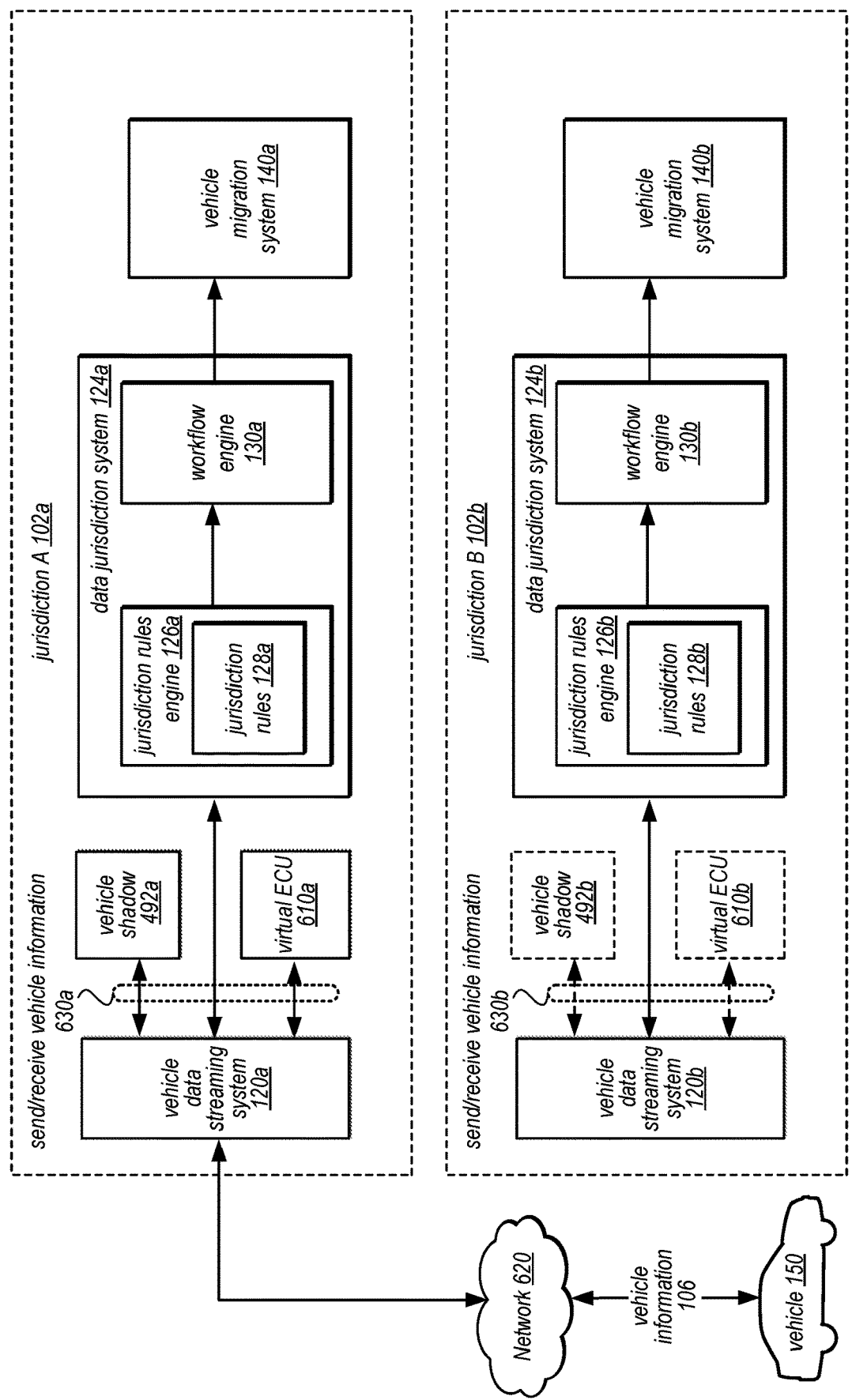
FIG. 6A illustrates a more detailed view of a data jurisdiction system before a vehicle information destination configuration is changed to a different jurisdiction and deactivation of a virtual electronic control unit (virtual ECU) or a vehicle shadow in one jurisdiction and activation in another jurisdiction, according to some embodiments.

FIG. 6A illustrates a more detailed view of a data jurisdiction system before a vehicle information destination configuration is changed to a different jurisdiction and deactivation of a virtual electronic control unit (virtual ECU) and/or a vehicle shadow from one jurisdiction and activation in another.

Similar to FIG. 2, the vehicle 150 may send a vehicle information 106 to the vehicle data streaming system 120a through a network 620 to the vehicle data streaming system 120a. The vehicle 150 may send the vehicle information 160 to vehicle data streaming system 120a in jurisdiction A 102a according to a configuration setting having jurisdiction A 102a as the destination for the vehicle information 106. In some embodiments, the destination configuration setting may be a particular data center or availability zone inside the jurisdiction. The network 620 may be a private or public network such as a direct connection to a service provider network hosting the vehicle data streaming system 120a, or an Internet connection. Network 620 may furthermore be a wireless network, such as a cellular network, Wi-Fi network or other wireless network. While not specifically shown in FIG. 6A, in some embodiments, the vehicle data streaming system 120a may receive vehicle information from a variety of other vehicle information sources such as vehicle service center.

The vehicle data streaming system 120a may send/receive vehicle information 630a with the vehicle shadow 492a, a virtual engine control unit (ECU) 610a, and the data jurisdiction system 124a in jurisdiction A 102a. Jurisdiction A 102a may be an authoritative jurisdiction wherein the vehicle shadow 492a and/or vehicle ECU 610a is the primary instances that takes priority in updating and synchronizing with the vehicle 150. As described in FIG. 4B, the vehicle shadow 492a stored locally in jurisdiction A 102a may be a virtual representation of the physical vehicle and may execute a remote command and synchronize vehicle states between the physical vehicle and itself in real time. In some embodiments the vehicle shadow 492a may send/receive vehicle information using multiple sources apart from the vehicle data streaming system 120a. The vehicle information 106 may be used to update various vehicle shadow 492a attributes as discussed in FIG. 4B. The virtual ECU may also send/receive vehicle information 610a from the vehicle 150 via the network 620. A virtual ECU may be used to control multitude of sensors within the vehicle, interpreting the sensor data, and adjusting controlled system in the vehicle. The virtual ECU may be used to control vehicle systems of the vehicle in real time or near-real time. The vehicle information 106 sent to the vehicle data streaming system 120a may work with data jurisdiction system 124a and the vehicle migration system 140a to detect a change in jurisdiction of the vehicle. It may perform subsequent downstream application of jurisdiction rules 128a using the jurisdiction rules engine 126a and the workflow engine 130a as discussed in FIG. 2.

Figure 6B:
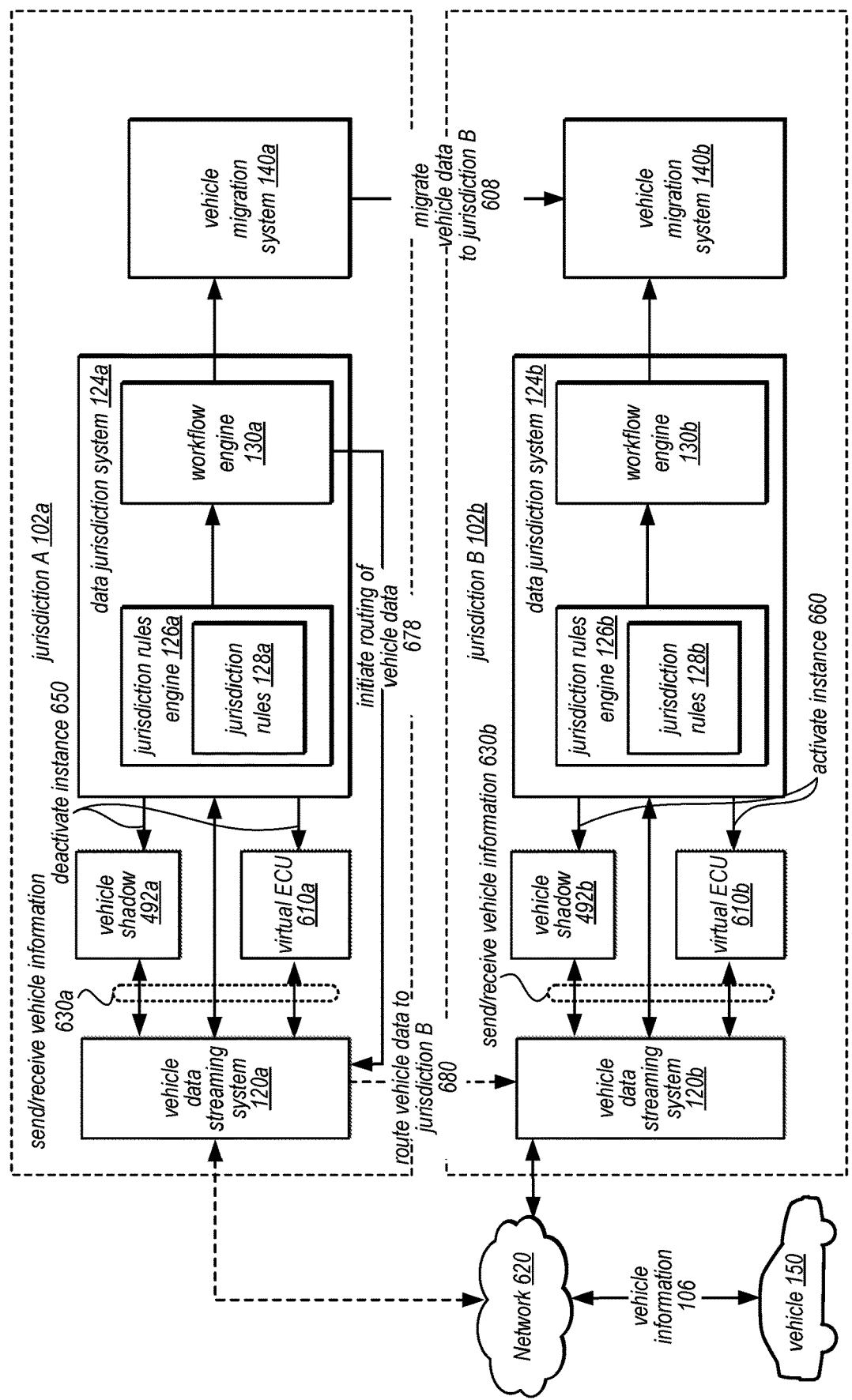
FIG. 6B illustrates a more detailed view of a data jurisdiction system that changes a vehicle information destination configuration to a different jurisdiction and deactivates a virtual electronic control unit (virtual ECU) or vehicle shadow in one jurisdiction and activates the virtual ECU and/or the vehicle shadow in another jurisdiction, according to some embodiments.

FIG. 6B illustrates a more detailed view of a data jurisdiction system that changes vehicle information destination configuration to a different jurisdiction and deactivates a virtual electronic control unit (virtual ECU) and/or a vehicle shadow from one jurisdiction and activates them in another.

Upon detection of the jurisdiction change event and resolution of applicable rules, the data jurisdiction system 124a may send a deactivate instance 650 instruction to the vehicle shadow 492a and to the virtual ECU 610a instances of the vehicle 150 stored locally in jurisdiction A 102a. The data jurisdiction system 124b also in conjunction activates instances 660 of the vehicle shadow 492b and the virtual ECU 610b implemented in jurisdiction B 102b. In some embodiments, the deactivate instance 650 and the activate instance 660 instructions may occur as a result of the migrating of vehicle data to jurisdiction B 608 from jurisdiction A 102a. In other embodiments, the deactivation/activation of the vehicle shadows 494b, 492b and virtual ECUs 610a, 610b may not be accompanied by the data migration, but may occur independently based on the jurisdiction rules 128a, 128b. In some embodiments, a snapshot of the deactivated vehicle shadow 492a and virtual ECU 610a of jurisdiction A 102a may be stored in jurisdiction A 102a. In other embodiments, the vehicle shadow 492a and virtual ECU 610a of jurisdiction A 102a may not be deactivated but may become a non-authoritative instance. In some embodiments, the workflow engine 130a may initiate routing of vehicle data 678 to route incoming vehicle information to jurisdiction B 680 such as jurisdiction B 102b. The workflow engine 130a may create one or more routing rules (or modify one or more existing routing rules) to reconfigure vehicle data streaming system 120a to route incoming vehicle information 106 to jurisdiction B 102b as determined by the workflow engine 130a according to the jurisdiction rules 128a. The routing rules may contain various parameters to route incoming vehicle information 106 including duration, vehicle information type, jurisdiction destination, VIN, etc. The vehicle data streaming system 120a, in some embodiments, may route vehicle data to vehicle data streaming system 120b in jurisdiction B 102b.

In some embodiments, the change in jurisdiction of vehicle 150 from jurisdiction A 102a to jurisdiction B 102b may result in the data jurisdiction system 124a of jurisdiction A 102a sending vehicle scheme packets to the vehicle to modify the destination that vehicle information 106 are to be sent. The vehicle scheme packets may update the configuration setting of the vehicle information destination to jurisdiction B 102b upon receipt of the vehicle scheme packets sent to the vehicle.

Figure 6C:
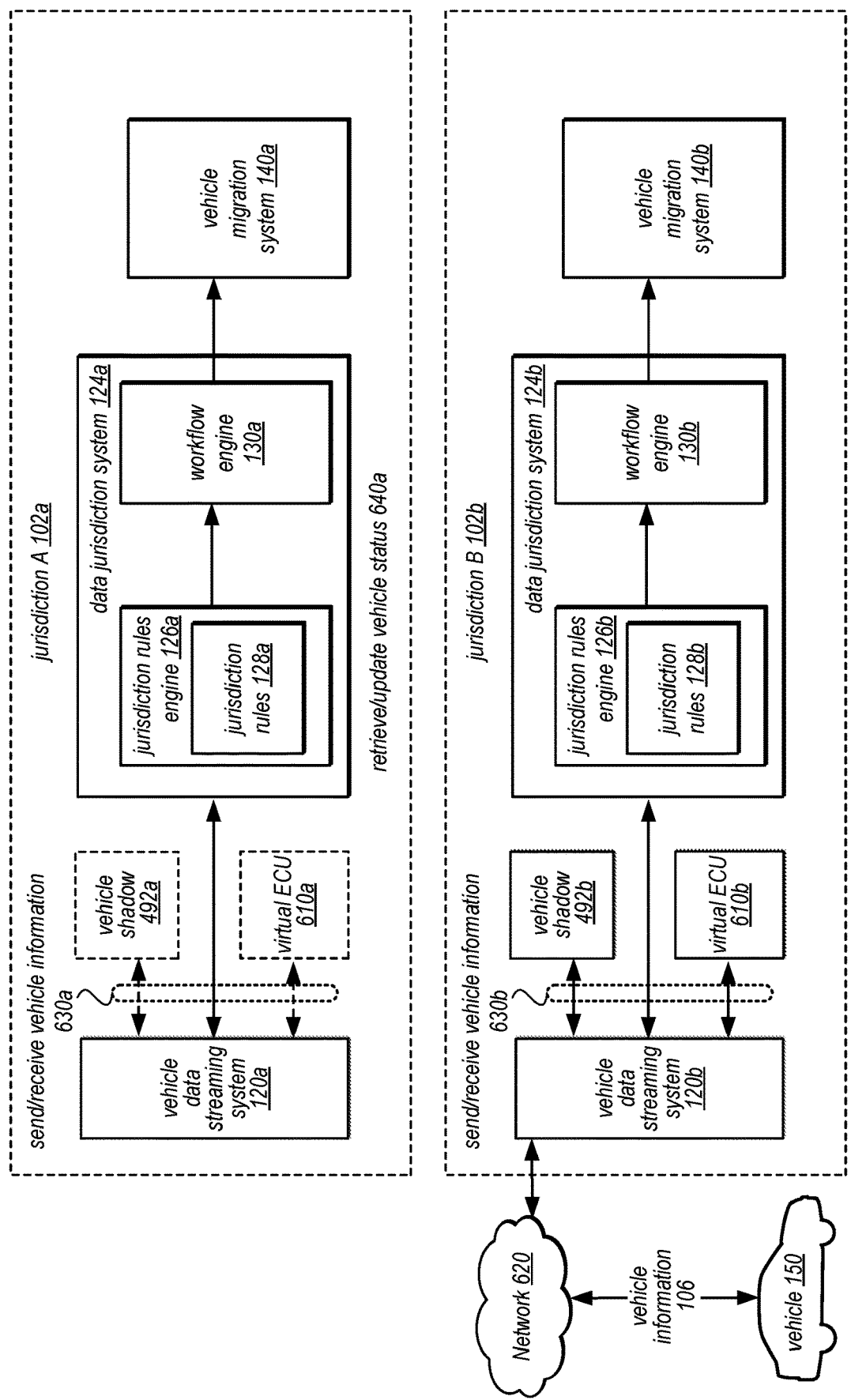
FIG. 6C illustrates a more detailed view of a data jurisdiction system after a vehicle information destination configuration is changed to a different jurisdiction and after a deactivation of virtual electronic control unit (virtual ECU) or vehicle shadow in one jurisdiction and activation in another jurisdiction, according to some embodiments.

FIG. 6C illustrates a more detailed view of a data jurisdiction system after a vehicle information destination configuration is changed to a different jurisdiction and after a deactivation of a virtual electronic control unit (virtual ECU) and/or a vehicle shadow from one jurisdiction and activation in another.

The vehicle 150 having an updated vehicle information destination configuration may send the vehicle information 106 to the vehicle data streaming system 120b in jurisdiction B 102b. Similar to FIG. 6A but taking place in jurisdiction B, the vehicle data streaming system 120b sends/receives vehicle information 630b with the vehicle shadow 492b, a virtual engine control unit (ECU) 610b, and the data jurisdiction system 124b in jurisdiction B 102B. The recently activated vehicle shadow 492b that is stored locally in jurisdiction B 102b may be a virtual representation of the physical vehicle and may execute remote commands and synchronize vehicle states between the physical vehicle and itself in real time via the vehicle data streaming system 120b in jurisdiction B 102b. The recently activated vehicle shadow 492b may also send/receive vehicle information using multiple sources apart from the vehicle data streaming system 120b. The subsequent vehicle information 106 received in the vehicle data streaming system 120b may be used to update various vehicle shadow 492b attributes as discussed in FIG. 4B. The virtual ECU 610b may also send/receive vehicle information 630b from the vehicle 150 via the network 620. As discussed in FIG. 6A, the virtual ECU may be used to control multitude of sensors within the vehicle, interpreting the sensor data, and adjusting engine actuators from jurisdiction B 102b. The vehicle information 106 sent to the vehicle data streaming system 120a may work with data jurisdiction system 124a and the vehicle migration system 140a to detect changes in jurisdiction of the vehicle and subsequent downstream application of jurisdiction rules 128a using the jurisdiction rules engine 126a and the workflow engine 130a as discussed in FIG. 2.

Figure 7:
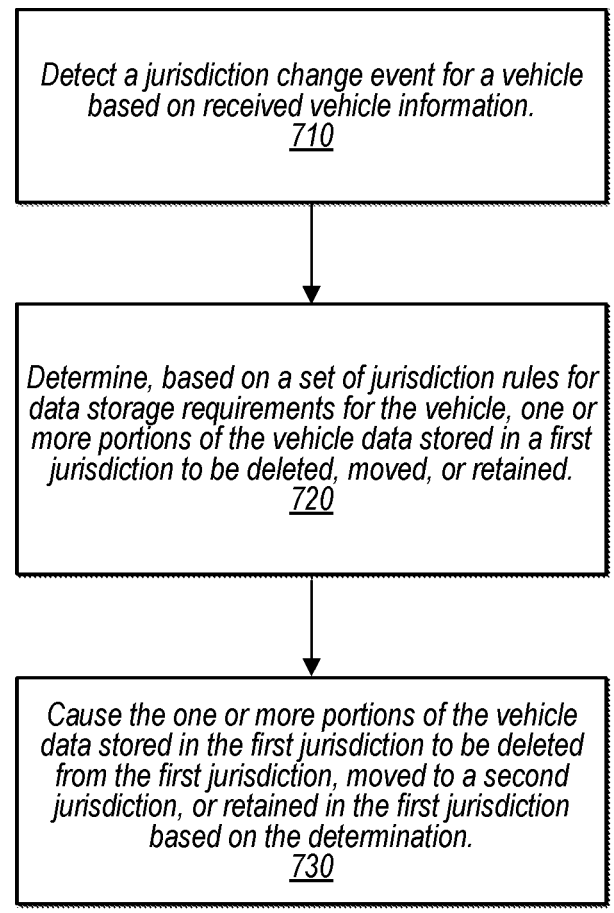
FIG. 7 illustrates a flowchart of operations performed by a vehicle data management system to determine a change in a jurisdiction of a vehicle, resolve conflicts between jurisdiction rules, and migrate data of the vehicle to one or more other jurisdictions in accordance with the jurisdiction rules, according to some embodiments.

FIG. 7 illustrates a flowchart of operations performed by a data jurisdiction system to determine a change in the jurisdiction of a vehicle based on a set of jurisdiction rules, resolve conflicts between the jurisdiction rules, and migrate data of the vehicle to one or more other jurisdictions.

At block 710 a data jurisdiction system of a vehicle data management system detects a jurisdiction change event for a vehicle based on received vehicle information. As discussed in FIG. 1, the jurisdiction change event may be detected using a single clear indication of vehicle jurisdiction change such as registration information change from the vehicle service center. In some embodiments jurisdiction change event may be detected based on plurality of various kinds of information such as GPS signals, vehicle service information, vehicle location history, etc. The jurisdiction change event may further be detected using a machine learning model trained using various vehicle information and jurisdiction rules as discussed in FIG. 3. In some embodiments a vehicle data streaming system of the vehicle data management system may be used to detect the jurisdiction change event.

At block 720, the data jurisdiction system determines, based on a set of jurisdiction rules for data storage requirements for the vehicle, one or more portions of the vehicle data stored in a first jurisdiction to be deleted, moved, or retained. The set of jurisdiction rules may include rules that are based on jurisdiction change event, data types, jurisdiction identities, or any combination herein as discussed in FIG. 1. In some embodiments, the data jurisdiction system may be independent of the larger data management system and may be a separate service. As discussed in FIG. 3, the data jurisdiction system may use a model trained using VIN of the vehicles having undergone a jurisdiction change event, their associated vehicle information, the jurisdiction rules applied, and other vehicle information to determine which jurisdiction rules to apply to the vehicle.

At block 730, the data jurisdiction system causes the one or more portions of the vehicle data stored in the first jurisdiction to be deleted from the first jurisdiction, moved to a second jurisdiction, or retained in the first jurisdiction based on the determination. In some embodiments, the data jurisdiction system determines the migration strategy that affects multiple other ones of the jurisdictions and causes data stored in other ones of the jurisdiction to be moved to the second jurisdiction as discussed in FIG. 5.

Figure 8:
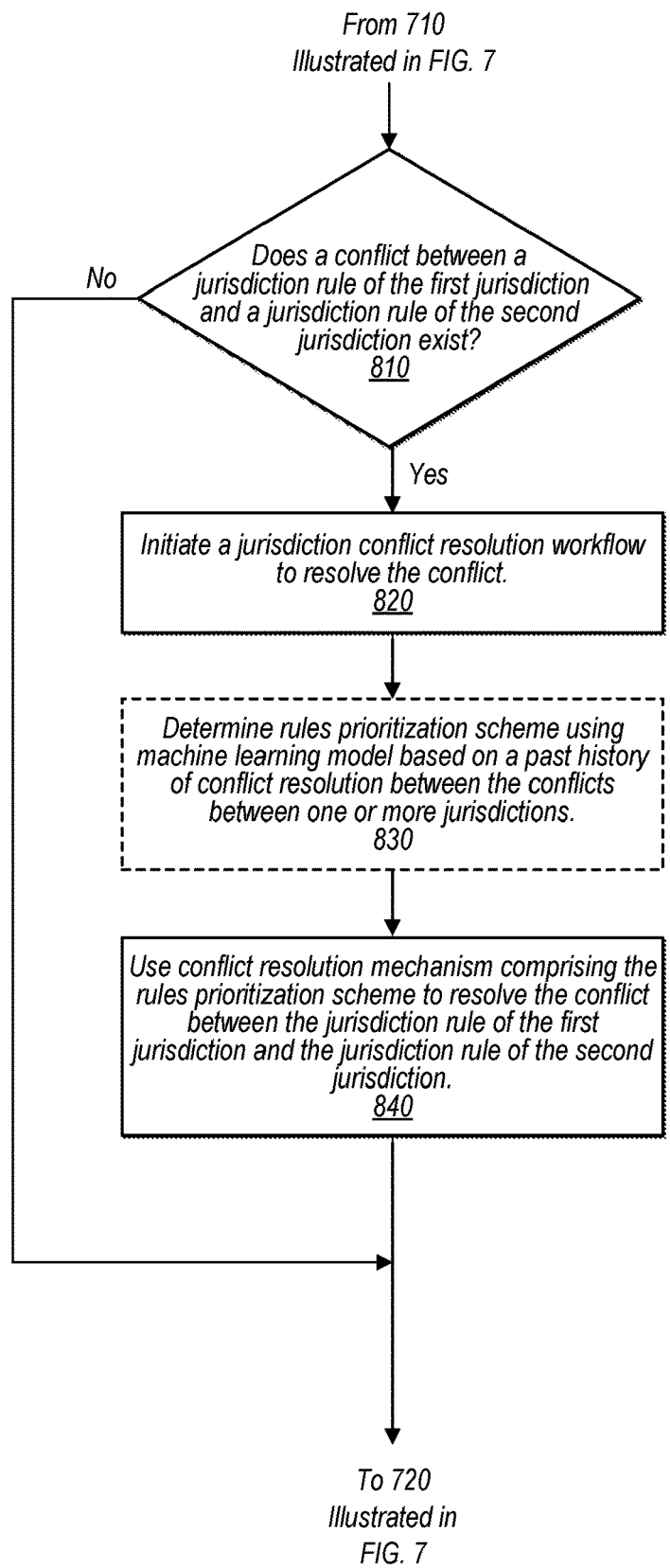
FIG. 8 illustrates a flowchart of operations performed by a vehicle data management system to determine whether a conflict exists between jurisdiction rules and resolves conflicts between the jurisdiction rules, according to some embodiments.

FIG. 8 illustrates a flowchart of operations performed by a vehicle data management system to determine whether a conflict exists between the jurisdiction rules and resolves conflicts between the jurisdiction rules.

At block 810 a data jurisdiction system determines whether a conflict between a jurisdiction rule of the first jurisdiction and a jurisdiction rule of the second jurisdiction exists. The jurisdiction rules conflict may be limited to a portion of the vehicle data, and in some embodiments may involve three or more jurisdiction rules concerning more than the first jurisdiction and second jurisdiction.

At block 820, if a conflict between a jurisdiction rule of the first jurisdiction and a jurisdiction rule of the second jurisdiction exists, the data jurisdiction system initiates a jurisdiction conflict resolution workflow to resolve the conflict. The jurisdiction conflict resolution workflow may include acquiring user decisions as further discussed in FIG. 3 and FIG. 9.

In some embodiments at block 830, the data jurisdiction system determines rules prioritization scheme using machine learning model based on a past history of conflict resolution between the conflicts between one or more jurisdictions. As discussed in FIG. 3, The machine learning model may be trained using not only past history of conflict resolution, but also other data associated with the resolution of the jurisdiction conflict such as past history of relevant jurisdiction rules, vehicle identity information, and affected vehicle data.

At block 840, the data jurisdiction system uses conflict resolution mechanism comprising the rules prioritization scheme to resolve the conflict between the jurisdiction rule of the first jurisdiction and the jurisdiction rule of the second jurisdiction. The predetermined prioritization scheme may be a set of instructions on how conflicting jurisdiction rules are to be resolved based on various factors such as jurisdiction rules type, vehicle identification information, and vehicle data affected. The predetermined prioritization scheme may determine which of the one or more jurisdiction rules of the conflicting rules to apply to one or more data of the vehicle as discussed in FIG. 3.

Figure 9:
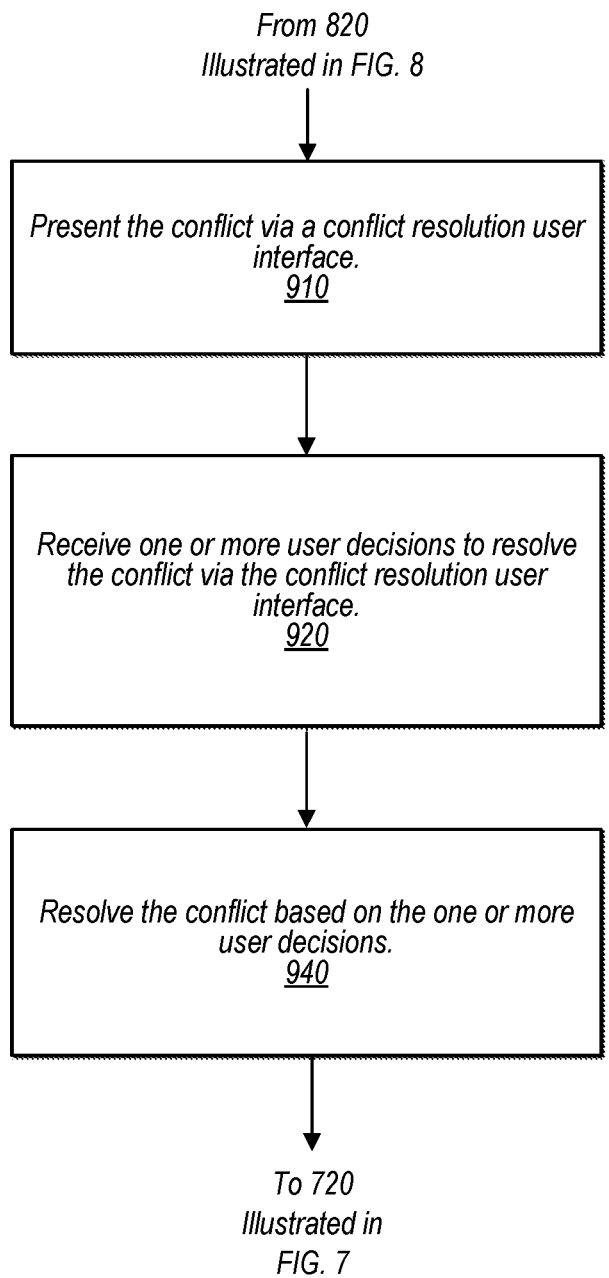
FIG. 9 illustrates a flowchart for implementing a conflict resolution workflow of the vehicle data jurisdiction system via a conflict resolution user interface, according to some embodiments.

FIG. 9 illustrates a flowchart implementing a conflict resolution workflow of the vehicle data jurisdiction system via a conflict resolution user interface.

At block 910 a data jurisdiction system presents a conflict via a conflict resolution user interface. The conflict resolution user interface may provide programmatic interfaces (e.g., APIs, web pages or web sites, graphical user interfaces, or command-line tools) to view conflicts, to enable the configuration and resolution of conflicts. In some embodiments, the conflict presented to the user via the interface may be translation of the conflict of jurisdiction rules into actionable decisions. In some embodiments, the conflict resolution user interface may notify the user of the conflict.

At block 920, the data jurisdiction system receives one or more user decisions to resolve the conflict via the conflict resolution user interface. The user decisions may include relevant decisions including a ranking of priority of the jurisdiction rules, determination of significance of the vehicle data, determination on the threshold transfer cost of the vehicle data affected, etc. as discussed in FIG. 3.

At block 930, the data jurisdiction system resolves the conflict based on the one or more user decisions. The resolution of conflict may be based directly on the user decision (i.e., decision that specifies which jurisdiction rule to apply versus the other), or may be based indirectly on the user decision. In some embodiments, the user decisions may be used as part the conflict resolution mechanism to resolve the jurisdiction rules conflict. In some embodiments, the data jurisdiction system may use a machine learning model trained using decisions obtained via the conflict resolution interface.

Figure 10:
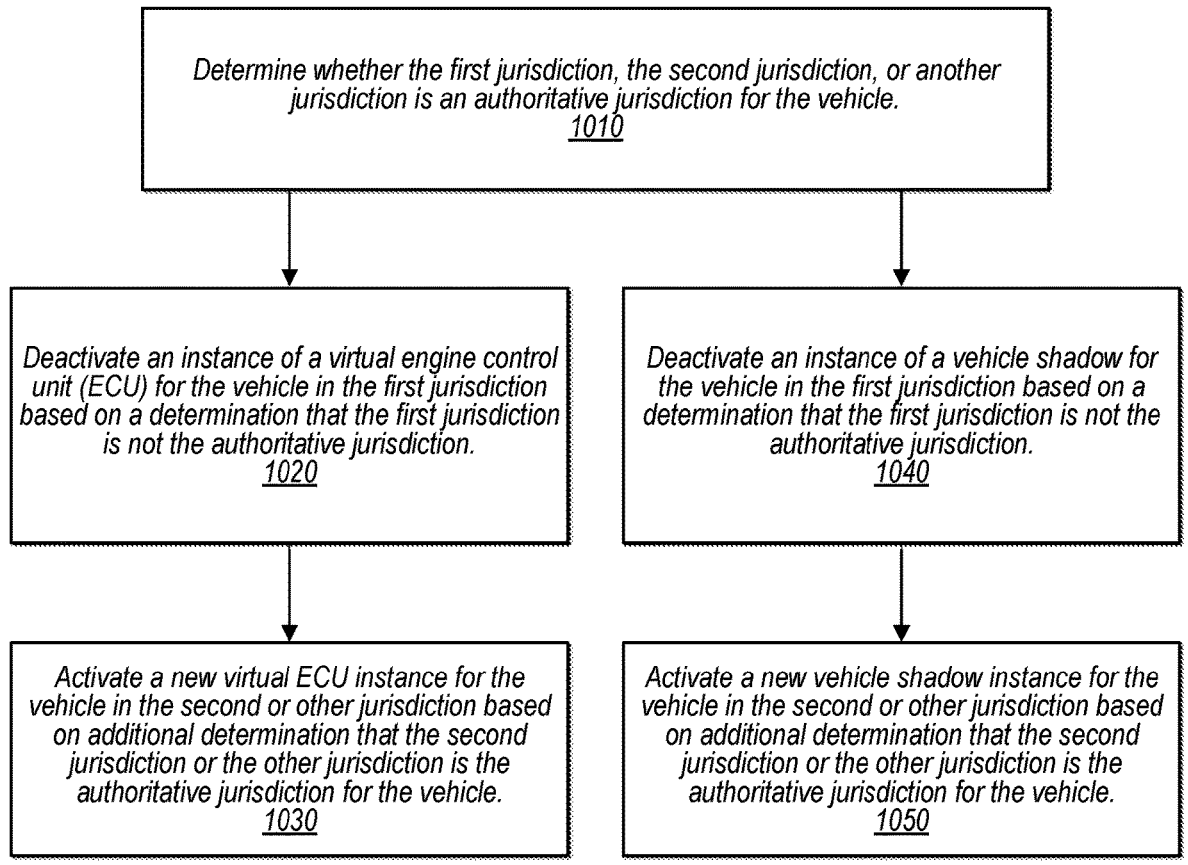
FIG. 10 illustrates a flowchart of operations performed by a vehicle data management system to deactivate a virtual electronic control unit (virtual ECU) or a vehicle shadow in one jurisdiction and activate the virtual ECU or vehicle shadow in another jurisdiction, according to some embodiments.

FIG. 10 illustrates a flowchart of operations performed by a vehicle data management system to deactivate virtual engine control unit/vehicle shadow from one jurisdiction and activate in another.

At block 1010 a data jurisdiction system determines whether the first jurisdiction, the second jurisdiction, or another jurisdiction is an authoritative jurisdiction for the vehicle. The authoritative jurisdiction for the vehicle. The determination may be made based on the vehicle status available in the vehicle shadow or in other vehicle information storage node.

At block 1020, the data jurisdiction system deactivates an instance of a virtual ECU for the vehicle in the first jurisdiction based on a determination that the first jurisdiction is not the authoritative jurisdiction. The deactivation of the virtual ECU may be partial or complete. In some embodiments, the snapshot of the deactivated virtual ECU of the first jurisdiction may be stored in the first jurisdiction as discussed in FIG. 6B.

At block 1030, the data jurisdiction system activates a new virtual ECU instance for the vehicle in the second or other jurisdiction based on additional determination that the second jurisdiction or the other jurisdiction is the authoritative jurisdiction for the vehicle. The new virtual ECU instance may transfer data from the virtual ECU of the first jurisdiction and may become the new authoritative virtual ECU for the vehicle. In some embodiments, the new vehicle shadow instance as the authoritative instance may control multitude of sensors within the vehicle in real time.

At block 1040, a vehicle information extraction service deactivates an instance of a vehicle shadow for the vehicle in the first jurisdiction based on a determination that the first jurisdiction is not the authoritative jurisdiction. The deactivation of the vehicle shadow may be partial or complete. In some embodiments, the snapshot of the deactivated vehicle shadow of the first jurisdiction may be stored in the first jurisdiction as discussed in FIG. 6B.

At block 1050, a vehicle information extraction service activates a new vehicle shadow instance for the vehicle in the second or other jurisdiction based on additional determination that the second jurisdiction or the other jurisdiction is the authoritative jurisdiction for the vehicle. The new vehicle shadow instance may transfer data from the vehicle shadow of the first jurisdiction and may become the new authoritative vehicle shadow for the vehicle. In some embodiments, the new vehicle shadow instance as the authoritative instance may execute remote command and synchronize vehicle states between the physical vehicle and itself in real time.

Figure 11:
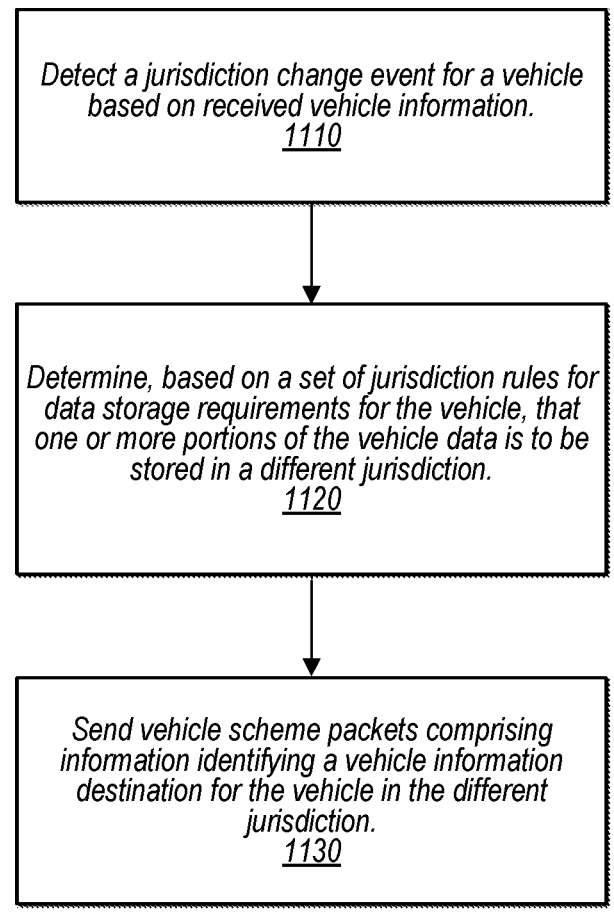
FIG. 11 illustrates a flowchart of operations performed by a vehicle data management system to change a jurisdiction to which the vehicle sends its vehicle information, according to some embodiments.

FIG. 11 illustrates a flowchart of operations performed by a vehicle data management system to change the jurisdiction in which the vehicle sends its vehicle information.

At block 1110 a data jurisdiction system detects a jurisdiction change event for a vehicle based on received vehicle information. As discussed in FIG. 1 and FIG. 7, the jurisdiction change event may be detected using a single clear indication of vehicle jurisdiction change such as registration information change from the vehicle service center. In some embodiments the jurisdiction change event may be detected based on plurality of various kinds of information such as GPS signals, vehicle service information, vehicle location history, etc.

At block 1120, the data jurisdiction system determines, based on a set of jurisdiction rules for data storage requirements for the vehicle, that one or more portions of the vehicle data is to be stored in a different jurisdiction.

At block 1130, the data jurisdiction system sends vehicle scheme packets comprising information identifying a vehicle information destination for the vehicle in the different jurisdiction. As discussed in FIG. 6C, the vehicle scheme packet may change the vehicle information destination configuration setting to that of another jurisdiction such that subsequent vehicle information is directed to the new jurisdiction.

Example Computer System

Figure 12:
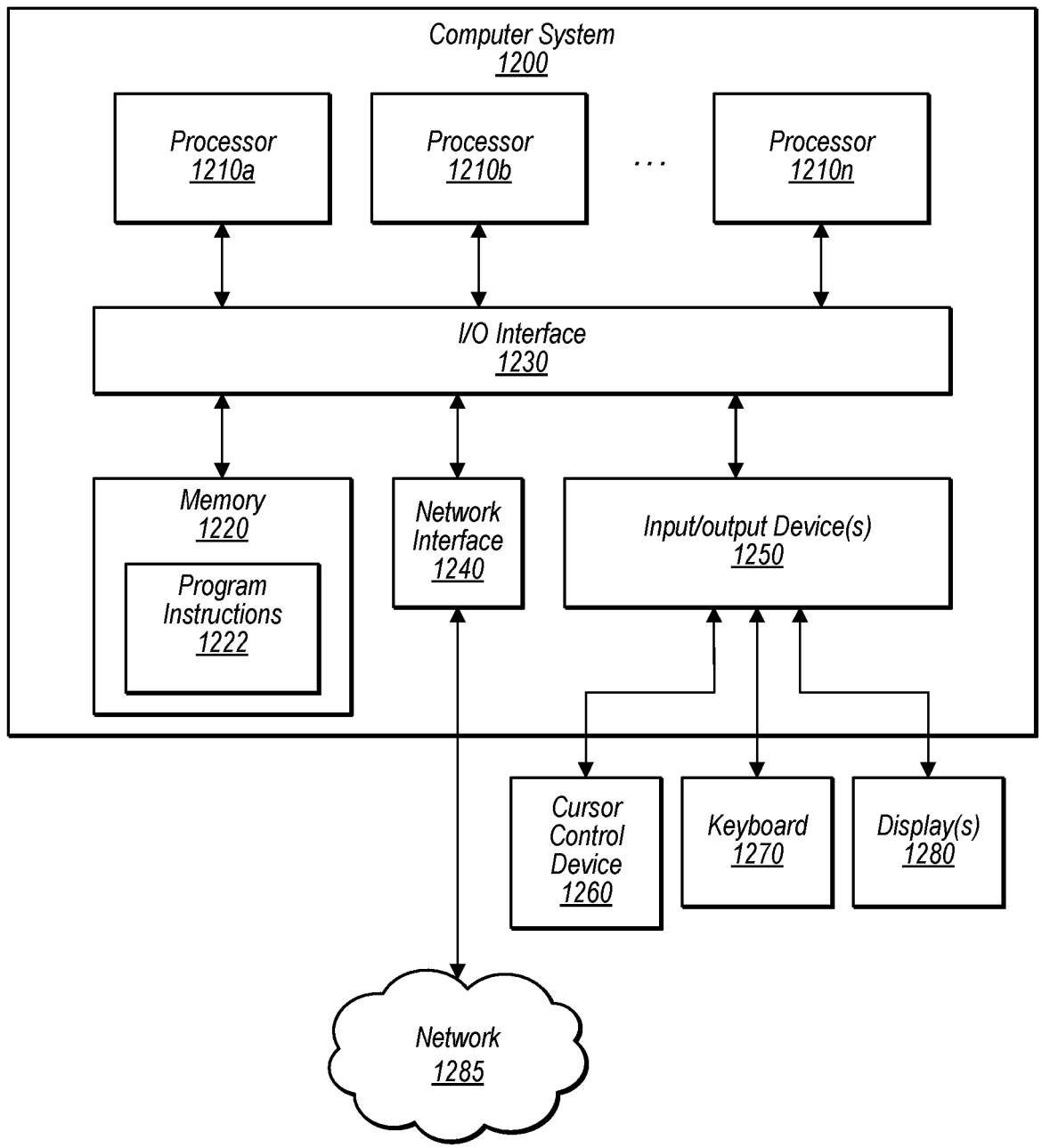
FIG. 12 illustrates a block diagram illustrating an example computer system that implements some or all of the techniques described herein, according to some embodiments.

FIG. 12 illustrates exemplary computer system 1200 usable to implement the vehicle data management system and data jurisdiction system as described above with reference to FIGS. 1-11. In different embodiments, computer system 1200 may be any of various types of devices, including, but not limited to, a personal computer system, desktop computer, laptop, notebook, tablet, slate, pad, or netbook computer, handheld computer, workstation, network computer, a mobile device, a consumer device, application server, storage device, a peripheral device such as a switch, modem, router, or in general any type of computing or electronic device.

Various embodiments of program instructions for determining a change in the jurisdiction of a vehicle based on a set of jurisdiction rules, resolving conflicts between the jurisdiction rules, and migrating data of the vehicle to one or more other jurisdictions, as described herein, may be executed in one or more computer systems 1200, which may interact with various other devices. Note that any component, action, or functionality described above with respect to FIGS. 1-11 may be implemented on one or more computers configured as computer system 1200 of FIG. 12, according to various embodiments. In the illustrated embodiment, computer system 1200 includes one or more processors 1210 coupled to a system memory 1220 via an input/output (I/O) interface 1230. Computer system 1200 further includes a network interface 1240 coupled to I/O interface 1230, and one or more input/output devices 1250, such as cursor control device 1260, keyboard 1270, and display(s) 1280. In some cases, it is contemplated that embodiments may be implemented using a single instance of computer system 1200, while in other embodiments multiple such computer systems, or multiple nodes making up computer system 1200, may be configured to host different portions or instances program instructions as described above for various embodiments. For example, in one embodiment some elements of the program instructions may be implemented via one or more nodes of computer system 1200 that are distinct from those nodes implementing other elements.

In some embodiments, computer system 1200 may be implemented as a system on a chip (SoC). For example, in some embodiments, processors 1210, memory 1220, I/O interface 1230 (e.g., a fabric), etc. may be implemented in a single SoC comprising multiple components integrated into a single chip. For example, an SoC may include multiple CPU cores, a multi-core GPU, a multi-core neural engine, cache, one or more memories, etc. integrated into a single chip. In some embodiments, an SoC embodiment may implement a reduced instruction set computing (RISC) architecture, or any other suitable architecture.

System memory 1220 may be configured to store compression or decompression program instructions 1222 and/or sensor data accessible by processor 1210. In various embodiments, system memory 1220 may be implemented using any suitable memory technology, such as static random-access memory (SRAM), synchronous dynamic RAM (SDRAM), nonvolatile/Flash-type memory, or any other type of memory. In the illustrated embodiment, program instructions 1222 may be configured to implement any of the functionality described above. In some embodiments, program instructions and/or data may be received, sent or stored upon different types of computer-accessible media or on similar media separate from system memory 1220 or computer system 1200.

In one embodiment, I/O interface 1230 may be configured to coordinate I/O traffic between processor 1210, system memory 1220, and any peripheral devices in the device, including network interface 1240 or other peripheral interfaces, such as input/output devices 1250. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computer system 1200 and other devices attached to a network 1285 (e.g., carrier or agent devices) or between nodes of computer system 1200. Network 1285 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1240 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 1250 may, in some embodiments, include one or more display terminals, keyboards, keypads, touchpads, scanning devices, voice or optical recognition devices, or any other devices suitable for entering or accessing data by one or more computer systems 1200. Multiple input/output devices 1250 may be present in computer system 1200 or may be distributed on various nodes of computer system 1200. In some embodiments, similar input/output devices may be separate from computer system 1200 and may interact with one or more nodes of computer system 1200 through a wired or wireless connection, such as over network interface 1240.

As shown in FIG. 12, memory 1220 may include program instructions 1222, which may be processor-executable to implement any element or action described above. In one embodiment, the program instructions may implement the methods described above. In other embodiments, different elements and data may be included.

Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
one or more computing devices configured to implement a data jurisdiction management system configured to:
detect, based on received vehicle information, a jurisdiction change event for a vehicle, wherein vehicle data for the vehicle is stored in a first jurisdiction;
determine, using the data jurisdiction management system, whether a conflict exists between a jurisdiction rule of the first jurisdiction and a jurisdiction rule of a second jurisdiction;
determine, based on the determination of whether the conflict exists, and based on a set of jurisdiction rules comprising the jurisdiction rule of the first jurisdiction and the jurisdiction rule of the second jurisdiction, one or more portions of the vehicle data stored for the vehicle to be deleted, moved, or retained, wherein the set of jurisdiction rules are based on data storage requirements for the vehicle; and
cause the one or more portions of the vehicle data stored in the first jurisdiction to be deleted from the first jurisdiction, moved to the second jurisdiction, or retained in the first jurisdiction based on the determination.

2. The system of claim 1, wherein the determination is to move the one the
one or more portions of the vehicle data based on the set of jurisdiction rules, and wherein the system further comprises:
one or more computing devices configured to implement a data migration system
configured to:
receive a migration notice from the data jurisdiction management system that identifies the one or more portions of the vehicle data to be moved; and
move, based on the received migration notice, the one or more portions of the vehicle data stored in the first jurisdiction to the second jurisdiction.

3. The system of claim 1, wherein the data jurisdiction management system is further configured to:
receive a rule update to add, delete, or modify one or more of the jurisdiction rules of the set of jurisdiction rules; and
propagate the rule update to one or more locally stored copies of the set of jurisdiction rules stored in the respective jurisdictions.

4. The system of claim 1, wherein the vehicle data is further stored in a third jurisdiction and the jurisdiction change event is between the first jurisdiction and the second jurisdiction, and wherein the data jurisdiction management system is further configured to:
determine, based on the set of jurisdiction rules, another portion of the vehicle data stored for the vehicle in the third jurisdiction to be deleted, moved, or retained.

5. The system of claim 1, wherein the data jurisdiction management system is further configured to:
detect, based on the set of jurisdiction rules, the conflict between the jurisdiction rule of the first jurisdiction and the jurisdiction rule of the second jurisdiction;

initiate a jurisdiction conflict resolution workflow to resolve the conflict; and cause the one or more portions of the vehicle data stored in the first jurisdiction to be deleted, moved, or retained in accordance with a result of the conflict resolution workflow.

6. A method, comprising:

detecting a jurisdiction change event for a vehicle, using one or more computing devices configured to implement a data jurisdiction management system, wherein said detecting is based on received vehicle information, and wherein vehicle data for the vehicle is stored in a first jurisdiction;

determining, using the data jurisdiction management system, whether a conflict exists between a jurisdiction rule of the first jurisdiction and a jurisdiction rule of a second jurisdiction;

determining, using the data jurisdiction management system, based on the determination of whether the conflict exists, and based on a set of jurisdiction rules comprising the jurisdiction rule of the first jurisdiction and the jurisdiction rule of the second jurisdiction for data storage requirements for the vehicle, one or more portions of the vehicle data stored for the vehicle to be deleted, moved, or retained; and causing the one or more portions of the vehicle data stored in the first jurisdiction to be deleted from the first jurisdiction, moved to the second jurisdiction, or retained in the first jurisdiction based on the determination.

7. The method of claim 6, further comprising:

receiving, using the data jurisdiction management system, a rule update to add, delete, or modify one or more of the jurisdiction rules of the set of jurisdiction rules; and propagating the rule update to one or more locally stored copies of the set of jurisdiction rules.

8. The method of claim 6, further comprising:

determining, based on the set of jurisdiction rules, another portion of the vehicle data stored for the vehicle in a third jurisdiction to be deleted, moved, or retained, wherein the jurisdiction change event is between the first jurisdiction and the second jurisdiction.

9. The method of claim 6, further comprising:

determining, based on the set of jurisdiction rules, that one or more portions of the vehicle data is to be stored in a different jurisdiction; and sending one or more vehicle scheme packets to the vehicle based on the determination, wherein the vehicle scheme packets comprise information identifying a vehicle information destination in the different jurisdiction for information generated by the vehicle.

10. The method of claim 6, further comprising:

determining whether the first jurisdiction, the second jurisdiction, or another jurisdiction is an authoritative jurisdiction for the vehicle;

deactivating an instance of a virtual engine control unit (ECU) for the vehicle in the first jurisdiction based on a determination that the first jurisdiction is not the authoritative jurisdiction; and activating a new virtual ECU instance for the vehicle in the second or other jurisdiction based on additional determination that the second jurisdiction or the other jurisdiction is the authoritative jurisdiction for the vehicle.

11. The method of claim 6, further comprising:

determining whether the first jurisdiction, the second jurisdiction, or another jurisdiction is an authoritative jurisdiction for the vehicle;

deactivating an instance of a vehicle shadow for the vehicle in the first jurisdiction based on a determination that the first jurisdiction is not the authoritative jurisdiction; and activating a new vehicle shadow instance for the vehicle in the second or other jurisdiction based on additional determination that the second jurisdiction or the other jurisdiction is the authoritative jurisdiction for the vehicle.

12. One or more non-transitory, computer-readable storage media, storing program instructions that when executed on or across one or more processors cause the one or more processors to implement a data jurisdiction management system that implements:

detecting a jurisdiction change event for a vehicle, based on received vehicle information, wherein vehicle data for the vehicle is stored in a first jurisdiction;

determining, using the data jurisdiction management system, whether a conflict exists between a jurisdiction rule of the first jurisdiction and a jurisdiction rule of a second jurisdiction;

determining, based on the determination of whether the conflict exists, and based on a set of jurisdiction rules comprising the jurisdiction rule of the first jurisdiction and the jurisdiction rule of the second jurisdiction for data storage requirements for the vehicle, one or more portions of the vehicle data stored for the vehicle to be deleted, moved, or retained; and causing the one or more portions of the vehicle data stored in the first jurisdiction to be deleted from the first jurisdiction, moved to the second jurisdiction, or retained in the first jurisdiction based on the determination.

13. The one or more non-transitory, computer-readable storage media as recited in claim 12, storing further program instructions that when executed on or across the one or more processors cause the one or more processors to implement:

receiving a rule update to add, delete, or modify one or more of the jurisdiction rules of the set of jurisdiction rules; and propagating the rule update to one or more locally stored copies of the set of jurisdiction rules stored in the respective jurisdictions.

14. The one or more non-transitory, computer-readable storage media as recited in claim 12, storing further program instructions that when executed on or across the one or more processors cause the one or more processors to implement:

detecting, in the set of jurisdiction rules, the conflict between the jurisdiction rule of the first jurisdiction and the jurisdiction rule of the second jurisdiction;

initiating a jurisdiction conflict resolution workflow to resolve the conflict; and wherein the said determining is performed in accordance with a result of the conflict resolution workflow.

15. The one or more non-transitory, computer-readable storage media as recited in claim 14, wherein the conflict resolution workflow comprises a predetermined conflict resolution mechanism comprising a rules prioritization scheme for resolving the conflict between the jurisdiction rule of the first jurisdiction and the jurisdiction rule of the second jurisdiction.

16. The one or more non-transitory, computer-readable storage media as recited in claim 15, wherein the rules prioritization scheme is determined using a machine learning model based on a past history of conflict resolution between the one or more jurisdictions.

17. The one or more non-transitory, computer-readable storage media as recited in claim 14, wherein performing the conflict resolution workflow comprises:
  providing a conflict resolution user interface; and
  receiving one or more user decisions to resolve the conflict via the conflict resolution user interface.

18. The one or more non-transitory, computer-readable storage media as recited in claim 12, wherein the said detecting the jurisdiction change event for the vehicle is further based on a machine learning model trained using a past history of received vehicle information and the jurisdiction rules.

19. The one or more non-transitory, computer-readable storage media as recited in claim 12, wherein the vehicle information used to detect the jurisdiction change comprise global position system (GPS) data, vehicle registration information, or vehicle servicing information.

20. The one or more non-transitory, computer-readable storage media as recited in claim 12, storing further program instructions that when executed on or across the one or more processors cause the one or more processors to implement:
  determining, based on the set of jurisdiction rules for data storage requirements for the vehicle, the one or more portions of the vehicle data stored for the vehicle to be copied, partially copied, or refused to be copied; and
  causing the one or more portions of the vehicle data stored in the first jurisdiction to be copied to the second jurisdiction, partially copied to the second jurisdiction, or refused to be copied to the second jurisdiction based on the determination.

* * * * *